United States Patent
Bruno et al.

(10) Patent No.: US 12,306,046 B2
(45) Date of Patent: May 20, 2025

(54) ENHANCED COOKER HOOD WITH SENSORS FOR REMOTE TEMPERATURE MEASUREMENT AND PRESENCE DETECTION

(71) Applicant: STMICROELECTRONICS S.r.l., Agrate Brianza (IT)

(72) Inventors: Giuseppe Bruno, Paterno (IT); Antonella La Malfa, Trecastagni (IT); Enrico Rosario Alessi, Catania (IT); Fabio Passaniti, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 635 days.

(21) Appl. No.: 17/513,675

(22) Filed: Oct. 28, 2021

(65) Prior Publication Data

US 2023/0152161 A1    May 18, 2023

(51) Int. Cl.
| | |
|---|---|
| *G01J 5/03* | (2022.01) |
| *F24C 15/20* | (2006.01) |
| *G01J 5/04* | (2006.01) |
| *G01J 5/24* | (2006.01) |

(52) U.S. Cl.
CPC .............. *G01J 5/24* (2013.01); *F24C 15/2021* (2013.01); *G01J 5/03* (2022.01); *G01J 5/041* (2013.01)

(58) Field of Classification Search
CPC .................................... G01J 5/03; G01J 5/802
See application file for complete search history.

(56) References Cited

U.S. PATENT DOCUMENTS

| | | | |
|---|---|---|---|
| 9,109,805 B2 | 8/2015 | Bach | |
| 9,696,457 B1* | 7/2017 | Mattes | ............... G01J 5/0025 |
| 2006/0244067 A1* | 11/2006 | Socher | ............ H01L 27/14669 |
| | | | 257/350 |
| 2006/0278216 A1* | 12/2006 | Gagas | ................. F24C 15/2028 |
| | | | 126/299 D |
| 2013/0187781 A1* | 7/2013 | Bach | ................... F24C 15/2064 |
| | | | 126/299 R |
| 2020/0011535 A1 | 1/2020 | Lambert et al. | |
| 2021/0209790 A1* | 7/2021 | Lindstedt | ............. G06V 10/143 |

(Continued)

FOREIGN PATENT DOCUMENTS

| | | |
|---|---|---|
| CN | 108916959 A | 11/2018 |
| CN | 109990900 A | 7/2019 |

(Continued)

OTHER PUBLICATIONS

Melexis NV MLX90632 Datasheet, 35 pages (Year: 2018).*

(Continued)

*Primary Examiner* — Dani Fox
*Assistant Examiner* — Shun Lee
(74) *Attorney, Agent, or Firm* — Seed IP Law Group LLP

(57) ABSTRACT

A device including a sensor is disclosed. In one embodiment, the sensor includes a thermal infrared sensor or a sensor based on CMOS-SOI-MEMS technology (also referred to as "TMOS"). The sensor is capable of performing at least two functions at the same time. The first is remote temperature measurement and the second is presence detection. The sensor passively collects infrared information and a microprocessor coupled to the sensor determines the temperature as well as presence.

16 Claims, 15 Drawing Sheets

(56) References Cited

U.S. PATENT DOCUMENTS

2021/0247074 A1    8/2021  Sinur et al.
2022/0065457 A1*   3/2022  Bailey .................. H05B 3/746

FOREIGN PATENT DOCUMENTS

CN         111811662 A      10/2020
JP        2003264055 A       9/2003
WO    WO 2019203075 A1      10/2019

OTHER PUBLICATIONS

Melexis NV MLX90614 family Datasheet, 57 pages (Year: 2019).*
Proline Range Hoods, "Range Hoods 101, The Range Hood Features of Today and Tomorrow," Feb. 3, 2020, URL=https://www.prolinerangehoods.com/blog/the-range-hood-features-of-today-and-tomorrow/, download date Sep. 6, 2021. (16 pages).
Temperature Electronics Ltd., "Kitchen Hood Controls (VAV) Data Sheet," 2016, www.tel-uk.com. (2 pages).
Avraham et al., "Wafer-Level Packaged CMOS-SOI-MEMS Thermal Sensors at Wide Pressure Range for IoT Applications," *Engineering Proceedings* 2(30):1-7, Nov. 14, 2020.
Moisello et al., "An Integrated Thermopile-Based Sensor with a Chopper-Stabilized Interface Circuit for Presence Detection," *Sensors* 19(18):1-19, Sep. 16, 2019.
Melixis, "MLX90632 FIR sensor," *Product Datasheet, Document No. 3901090632*, Revision 10, Nov. 2020, 55 pages.
Flir Systems Inc., "IR Automation Guidebook: Temperature Monitoring and Control with IR Cameras," 2008. (68 pages).
Saraf et al., "CMOS-SOI-MEMS Uncooled Infrared Security Sensor With Integrated Readout," *Journal of the Electron Devices Society* 4(3):155-162, May 2016.

* cited by examiner

ENHANCED COOKER HOOD WITH SENSORS FOR REMOTE TEMPERATURE MEASUREMENT AND PRESENCE DETECTION

BACKGROUND

Technical Field

The present disclosure relates to a device having a sensor for temperature measurement and for presence detection.

Description of the Related Art

Cooker hoods come with various features to accommodate the growing needs of customers. The cooker hood includes ventilation systems and alarm systems as well as other features. Additional features can be implemented through various type of sensors (e.g., smoke detectors, infrared sensors, temperature sensors, or the like).

However, incorporating various sensors and devices in the cooker hood likely drives up the cost of the cooker hood. Generally the cooker hood is placed over a stove top or burners (electric, gas, induction, etc.). As a result, heat is frequently received or interacts with the sensors and the various devices incorporated in the cooker hood, which may heat up the devices and deteriorate the functionality of the devices. This can decrease the life expectancy of the sensors and devices.

BRIEF SUMMARY

One or more embodiments of the present disclosure provide a device that includes a sensor and a processor. The sensor collects infrared data and the processor processes the infrared data so that multiple functions are performed including temperature measurement and presence detection. Both functions of remote temperature measurement and presence detection are performed based on the same set of collected infrared data from the sensor. Further, because these functions are performed using the same data, the function of presence detection (e.g., motion sensing) and temperature measurement may be conducted at the same time (simultaneously or concurrently). Having one device that is capable of performing multiple functions can reduce the cost of the device and the cooker hood incorporating the device.

One example of the sensor includes a thermal infrared sensor. It may include a wafer-level processed and wafer-level packaged low-cost microelectromechanical system (MEMS) thermal sensor or a sensor based on CMOS-SOI-MEMS technology (also referred to as "TMOS"). The TMOS is a MEMS device based on a suspended, thermally isolated, micro-machined floating transistor, which absorbs infrared radiation. A resulting temperature change is transduced into an electric signal. The TMOS operates at a subthreshold region, therefore requiring low power consumption. Accordingly, the overall power consumption of the device can be reduced.

Further, the processor may include an application-specific integrated circuit (ASIC) that has low power consumption. The specific instructions or algorithms for processing the infrared data collected from the sensor to perform the function of temperature measurement and the function of presence detection may be programmed into the ASIC.

As such, a device according to one or more embodiments of the present disclosure is capable of performing multiple functions at a low cost and while having low power consumption. Further, the device takes into account various factors including the properties of the objects (e.g., types of material, emissivity of the material) within a field of view of the sensor as well as the temperature rise in the ASIC during operation caused by the heat from the objects within the field of view of the sensor. Field of view is the angle that a sensor can see. Accordingly, the device can also provide a temperature measurement with improved accuracy compared to those thermal sensors commercially available.

One embodiment of the present disclosure includes an alternative device having an infrared sensor having a field of view. The device further includes a processor coupled to the infrared sensor. In some embodiments, the processor includes a temperature determination circuit and a first compensation circuit. The first compensation circuit is configured to compensate temperature based on characteristics of one or more objects on and adjacent to a heat generating structure in the field of view. In one embodiment, the characteristics of one or more objects includes a type of a material and emissivity of the material.

Another embodiment of the present disclosure includes a system, such as a cooking surface and ventilation or lighting hood system. The system includes a heat generating source (coil, electric smooth, etc.), a support structure (fan or light or other overhead structure), and a sensing device. The support structure is above and aligned with the heat generating source. The support structure has a first surface facing the heat generating source.

In some embodiments, the device is on the first surface of the support structure and the sensing device has a field of view of at least parts of the heat generating source. Here, the sensor is configured to collect infrared data of one or more objects within the field of view. In one embodiment, the infrared data is indicative of infrared signals including an intensity of infrared light.

The device also includes a temperature determination circuit coupled to the sensor. The temperature determination circuit is configured to determine temperature of the one or more objects within the field of view based on the collected infrared data. The device further includes a first compensation circuit configured to compensate temperature based on emissivity of the one or more objects within the field of view.

Another embodiment is directed to a presence detection method. The method includes receiving first infrared data from one or more objects within a field of view of a sensor. The method includes applying a first low pass filter to the first infrared data and applying a second low pass filter to the first infrared data. Here, the second low pass filter is different from the first low pass filter.

The method further includes determining presence signals based on a difference between an outcome of applying the first low pass filter to the first infrared data and an outcome of applying the second low pass filter to the first infrared data. The method includes comparing the presence signals with a difference of a presence threshold and a hysteresis threshold; and determining a presence of a subject with the field of view based on comparing the presence signals with a difference of a presence threshold and a hysteresis threshold.

BRIEF DESCRIPTION OF THE SEVERAL VIEWS OF THE DRAWINGS

Reference will now be made by way of example to the accompanying drawings. In the drawings, identical reference numbers identify similar elements or acts. In some drawings, however, different reference numbers may be used to indicate the same or similar elements. The shapes of various elements and angles are not necessarily drawn to scale, and some of these elements may be enlarged and positioned to improve drawing legibility.

DETAILED DESCRIPTION

Figure 1:
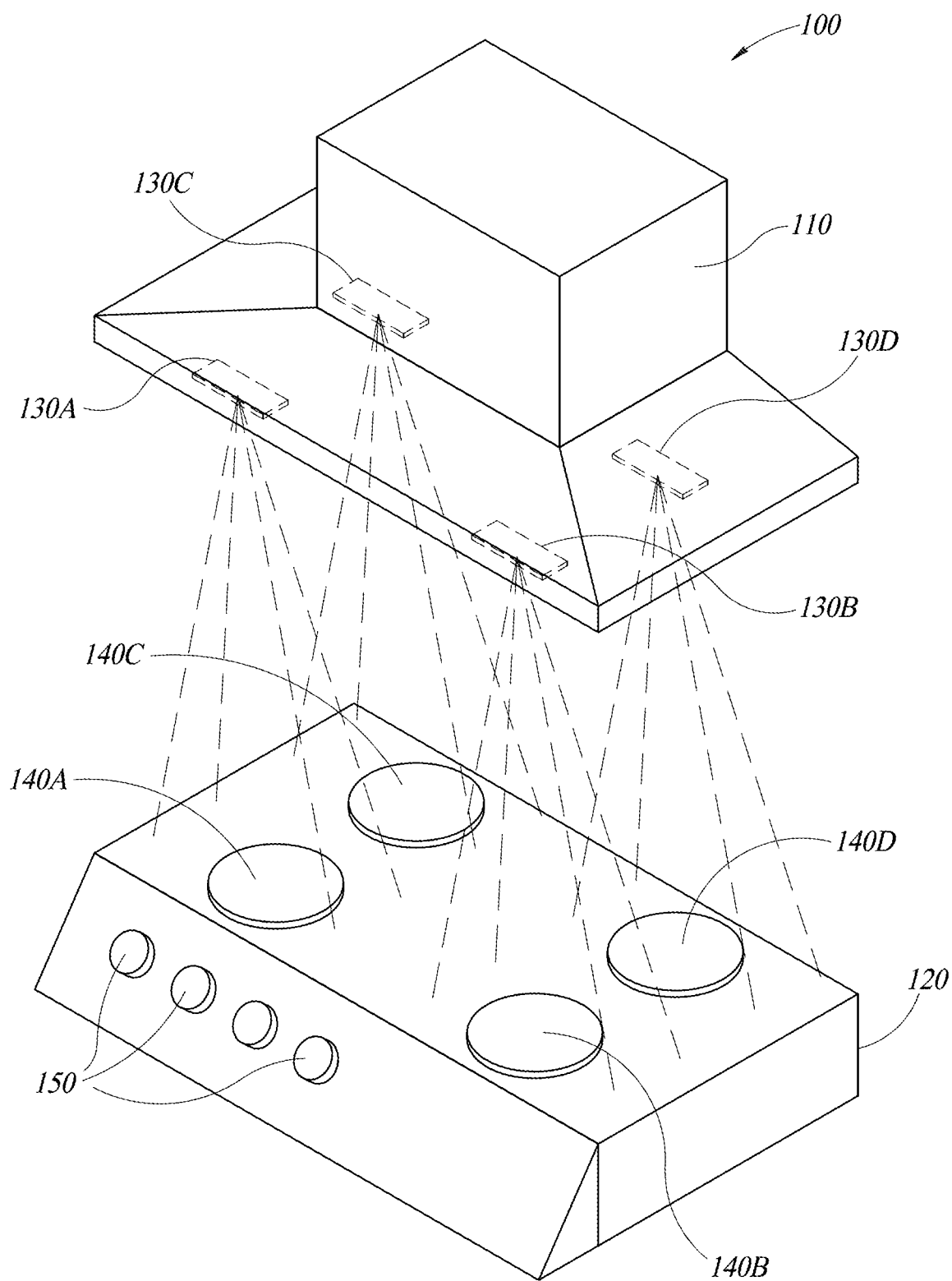
FIG. 1 is a perspective view of a system according to some embodiments of the present disclosure.

Technical advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted.

In describing a position relationship, when a position relation between two parts is described as, for example, "on," "over," "under," "adjacent," or "next," one or more other parts may be disposed between the two parts unless a more limiting term, such as "direct(ly)," is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments as mentioned above.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

FIG. 1 is a perspective view of a system according to some embodiments of the present disclosure.

As shown, a system 100 may be implemented as a cooking system. However, it will be apparent to a person of ordinary skill in the art that the applications of the various concepts disclosed in this disclosure is not limited to a cooking system. However, a cooking system is used as one example of an application. The cooking system 100 includes a cooker hood 110, which is a type of housing that is capable of housing multiple components within the cooker hood 110. One component included in the cooker hood 110 is a device or a sensor device 130.

In some embodiments, the cooking system 100 further includes a cooker 120 having thereon one or more cooking plates 140. The cooker 120 may have control terminals 150 configured to switch the cooking plates 140 ON and OFF and control the temperature of the cooking plates 140.

In the illustration, the cooking plates 140 include 4 cooking plates, e.g., 140A, 140B, 140C, and 140D. When the cooking plates are collectively referred to, reference number 140 will be used and when the individual cooking plate is referred to, individual reference number 140A, 140B, 140C, and 140D will be used. While the cooking plates 140A-140D are described as an induction cooktop or an electric cooktop, the present disclosure is not limited to these. The cooking plates as used herein broadly encompasses any type of heating source capable of heating any cooking ware (e.g., pans, pots, and other cooking utensils). Accordingly, the cooking plates 140 may also include gas ranges as well.

The device 130 which includes one or more sensors 200 is positioned on top of the cooker 120 and the cooking plates 140. In the illustration, there are 4 devices shown which includes device 130A, 130B, 130C, and 130D. When the devices 130 are collectively referred to, reference number 130 will be used and when the individual device is referred to, individual reference number 130A, 130B, 130C, and 130D will be used. Each device is substantially similar to each other although the embodiments are not limited to this. For example, in some embodiments, a field of view of an active area 205 of a sensor 200 (see FIGS. 5A and 5B) may differ for each device.

As shown, the devices 130 are above respective cooking plates 140 so that the respective cooking plates 140 are within a field of view of each device 130. For example, a first device 130A is above a first cooking plate 140A and the dotted line, which indicates the field of view further shows that the first cooking plate 140A is within the field of view of the first device 130A. Similarly, a second device 130B is above a second cooking plate 140B and the dotted line, which indicates the field of view further shows that the second cooking plate 140B is within the field of view of the second device 130B. A third device 130C is above a third cooking plate 140C and the dotted line, which indicates the field of view further shows that the third cooking plate 140C is within the field of view of the third device 130C. A fourth device 130D is above a fourth cooking plate 140D and the dotted line, which indicates the field of view further shows that the fourth cooking plate 140D is within the field of view of the fourth device 130D.

The various components of the device 130 will be further described in connection with FIG. 3. In one or more embodiments, the device 130 is configured to sense temperature remotely and is further configured to detect presence of humans or parts of humans (e.g., hands, fingers, heads, arms, bodies, and the like). In some embodiments, the device 130 may also include an alert device (e.g., various safety applications) to signal (e.g., a notification signal in the form of sound or display or any other that is capable of notifying a user of a potential threat or danger) that a user is close to contacting a heated instrument (e.g., pans, pots, cooking plates, or any other objects in the surroundings heated up due to the heated pans, pots, cooking plates). An alert device 280 does not necessarily have to be within the device 130. The alarm device may be located anywhere within the cooking system 100 and merely needs to be operatively and communicatively coupled to the device 130 (such as by wire or wirelessly) to receive at least one of presence information or temperature information.

According to some embodiments, a sensor 200 included in the device 130 is a thermal sensor capable of sensing temperature remotely by receiving infrared data (e.g., infrared light, intensity of infrared signals, infrared wavelengths or the like). In particular, thermal sensors are sensors that detect temperature changes at distant targets through the changes in radiation they emit. Since most objects can be treated as physical "black bodies," the amount and the spectrum of radiation they emit depend upon their temperature. The amount of radiation increases with temperature, and the peak wavelength of that emission decreases with temperature, such that objects at room temperature of 300° K have a peak wavelength at the far infrared range of about 10 um, while the Sun, with a surface temperature of 6000° K., has a peak wavelength at the visible green (e.g., 0.5 um). Therefore, sensors that are sensitive to radiation wavelengths corresponding to significant emission from the target objects can be used to detect changes in their temperature.

The temperature change in uncooled thermal sensors can be converted to an electrical signal using various methods. One of the method is thermocouples which can be used to measure the temperature difference between the sensor and the ambient temperature, with low sensitivity to the ambient temperature and there is no need for an applied voltage or current. Another approach utilizes resistive bolometers that measure the absolute temperature of a temperature-sensitive resistor. Further example methods include pyroelectric sensors that change the charge in a capacitor in response to temperature changes. Various methods of the temperature detection known and used in the art may be utilized herein.

One non-limiting example of a thermal sensor as used in the embodiments described herein includes a thermally isolated CMOS-SOI-MEMS transistor serving as IR detector (also referred to as "TMOS" sensor or "TMOS" IR sensor), passive infrared sensor, etc.

The TMOS sensor is a micromachined CMOS-SOI transistor, which acts as a sensing element. In particular, the TMOS is a microelectromechanical system (MEMS) device based on a suspended, thermally isolated, micro-machined floating transistor which absorbs infrared radiation. The resulting temperature change is transduced into an electric signal. Namely, the thermally isolated floating MOS (metal-oxide-silicon) transistor senses temperature changes induced by either a physical or a chemical phenomenon. The change in temperature modifies the threshold voltage and accordingly the I-V (current-voltage) characteristics of the micromachined transistor.

Further, the TMOS operates at the subthreshold region, therefore requiring low power consumption. Moreover, an inherent gain of the transistor results in the highest temperature sensitivity compared to commercial thermal sensors in the art. This provides various technical benefits as well as its possibility of wide applications.

Regardless of the application, like any MEMS device, it is beneficial for the TMOS to be packaged to protect the delicate structure from foreign, external materials such as dust and particles as well as to achieve the optimal performance. Wafer-level processing as well as wafer-level packaging with a controlled vacuum is beneficial to ensure high performance and low cost in manufacturing the TMOS.

Figure 2:
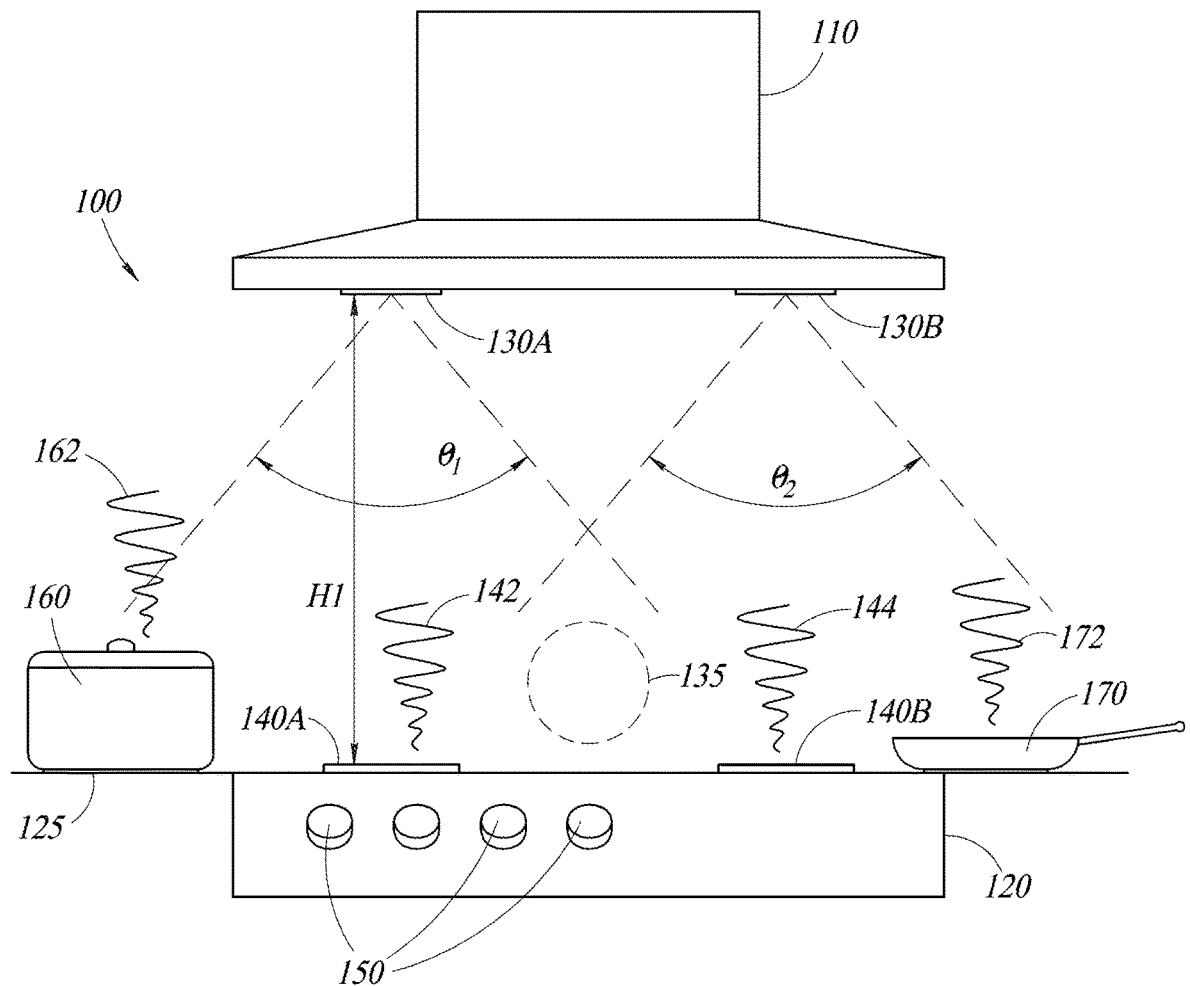
FIG. 2 is a side view of a system according to some embodiments of the present disclosure.

FIG. 2 is a side view of a system according to some embodiments of the present disclosure.

A cooking system includes a heat generating source or a heat generating structure (e.g., cooker plate, heated cooking appliances such as pans and pots, or any other structures heated and therefore emitting infrared data) and a support structure 110. The support structure 110 may also be referred to as a housing or a cooker hood as shown in FIG. 2.

As shown, various cooking ware may be adjacent to the cooker 120. For example, a countertop is adjacent to the cooker 120 and on a surface 125 of the countertop, a pot 160 is resting. The pot 160 may be already heated up using the first cooking plate 140A or the pot 160 may be ready to be mounted on the first cooking plate 140A for cooking, thus not being heated at all. On the other side, a pan 170 is on the surface 125 of the countertop adjacent to the second cooking plate 140B. Other various objects including cooking utensils (not shown) may be heated up if they are disposed near the cooking plates 140.

For example purposes, assume that the pot 160 and the pan 170 have been previously heated through the first cooking plate 140A and the second cooking plate 140B, respectively, and they have been placed on the surface 125 of the countertop adjacent to the cooker 120. A heat flow (or heat radiation or heat emission) 162 of the pot 160, a heat flow 142 of the first cooking plate 140A, a heat flow 144 of the second cooking plate 140B, and a heat flow 172 of the pan 170 are shown.

In some embodiments, the cooker hood 110 includes a ventilation system that is capable of venting away cooking odors and filter out heat, smoke, grease, and moisture. A vent of the ventilation system may be positioned adjacent to a first device 130A and a second device 130B (and a third device 130C and a fourth device 130D, although not shown in the side view of FIG. 2). The ventilation system incorporated in the cooker hood 110 at least partially affects the heat flow by causing the heat flow to be directed close to the first device 130A and the second device 130B. Such heat flow causes the temperature of the first device 130A and the second device 130B to rise when the devices 130 are heated up due to the heat flow from the various objects (e.g., cooking plates, pans, pots, kitchen utensils, etc.). The detailed mechanism for compensating the temperature increase of the device 130 itself will be explained later on.

The first device 130A is configured to sense and collect infrared data of the various objects that come within a first field of view $\theta_1$ of the first device 130A using a sensor 200 (for example, a TMOS IR sensor) incorporated within the first device 130A. The field of view may be adjusted to include the various heat generating structures (e.g., burner, cooker, cooking plates, pans, pots, kitchen utensils, or the like) as well as the material (e.g., steel, rubber, or the like) adjacent to the heat generating structures.

In FIG. 2, the first cooking plate 140A and the pot 160 is within the first field of view $\theta_1$ of the first device 130A. Similarly, the second device 130B is configured to sense infrared data of the various objects that come within a second field of view $\theta_2$ of the second device 130B using a sensor (for example, a TMOS IR sensor) incorporated within the second device 130B. In FIG. 2, the second cooking plate 140B and the pan 170 is within the second field of view $\theta_2$ of the second device 130B. In some embodiments, the second device 130B, the third device 130C, and the fourth device 130D may be configured to be identical or similar to the first device 130A. However, depending on the type of application and its use, in other embodiments, the structure and the function of the first, second, third, and fourth device may be different from each other.

The temperature of the pot 160, the heat flow 162 from the pot 160, the temperature of the first cooking plate 140A, and the heat flow 142 from the first cooking plate 140A are sensed by the first device 130A as it is within the first field of view $\theta_1$. Similarly, the temperature of the pan 170, the heat flow 172 from the pan 170, the temperature of the second cooking plate 140B, and the heat flow 144 from the second cooking plate 140B are sensed by the second device 130B as it is within the second field of view $\theta_2$.

In some embodiments, the first field of view $\theta_1$ of the first device 130A and the second field of view $\theta_2$ of the second device 130B may overlap and have an overlapping area 135. If there are heated objects within the overlapping area 135, each of the first device 130A and the second device 130B determines the temperature of the heated objects separately and determines the degree of temperature rise of the respective device caused by the heat flow from the heated objects.

In some embodiments, a field of view of the device 130 may be intentionally narrowed so that the accuracy of the temperature measurement of the objects within the field of view is further enhanced. In FIG. 2, the first field of view $\theta_1$ is about 70 degrees to 90 degrees and the second field of view $\theta_2$ may have similar range. However, in FIG. 4, a lens 220 is coupled to a sensor 200 of the device 130, which narrows the field of view of the device 130. Here, due to the lens 220, the first field of view $\theta_1$ may now have a view that is less than about 70 degrees and the second field of view $\theta_2$ may have similar range as well.

Figure 4:
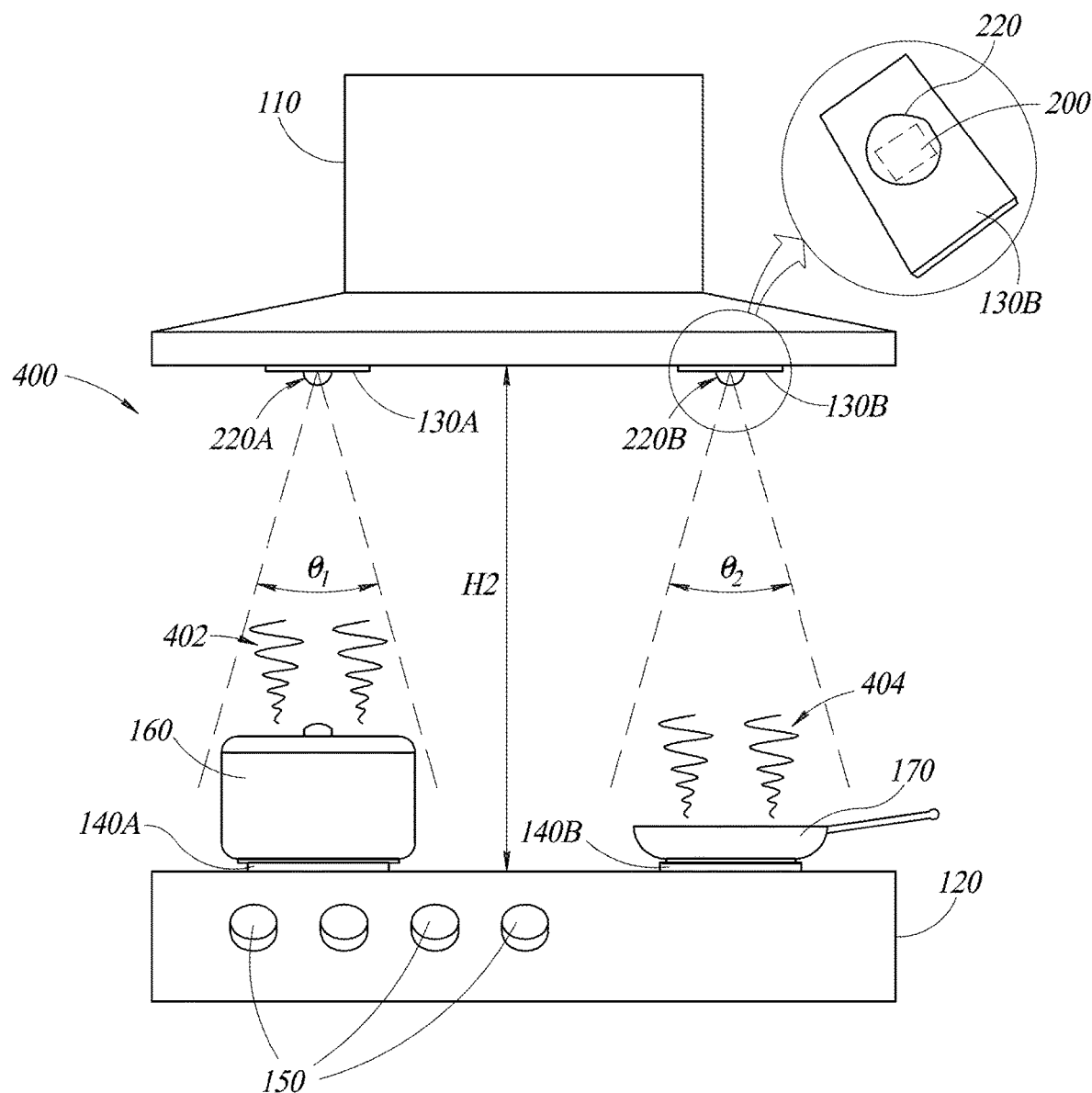
FIG. 4 is a side view of a device having a lens according to some embodiments of the present disclosure.

Further, the field of view of the device 130 may be adjusted according to a distance H1 between the device 130 and the cooker 120. Often, the cooker 120 and the cooker hood 110 are sold separately in the market. Further, based on the unique structure and design of each household's kitchen, the distance H1 may vary. If distance H1 is too far apart, the objects caught within the field of view can be multiple objects. These cases may lead to an inaccurate determination of the temperature of the objects within the field of view. In these circumstances, the field of view of the device 130 may be adjusted by coupling a lens 220 on the sensor 200 of the device 130. This way, even in cases where a distance H2 as shown in FIG. 4 is greater than distance H1, the field of view can be narrowed and efficiently capture the heated objects within the narrowed field of view shown in FIG. 4. Accordingly, in case the cooker hood 110 and the cooker 120 is sold separately and installed separately and therefore cause distance H2 between the cooker hood 110 and the cooker 120 to vary, the lens 220 may adjust the field of view to take into account distance H2.

Figure 3:
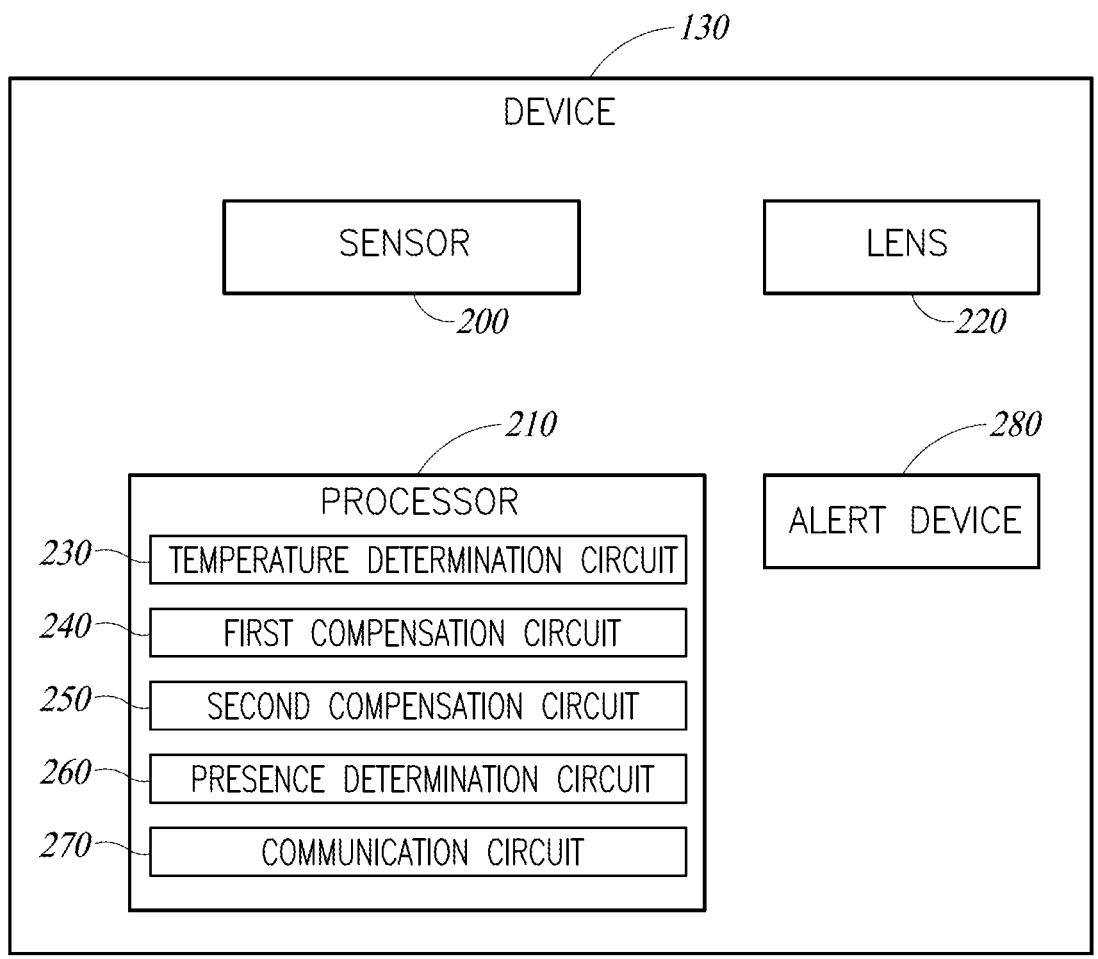
FIG. 3 is a block diagram of a device according to some embodiments of the present disclosure.

FIG. 3 is a block diagram of a device according to some embodiments of the present disclosure.

A device 130 includes a sensor 200 and a processor 210 operatively coupled to the sensor 200. In some embodiments, the device 130 includes a lens 220 that is coupled to the sensor 200 to adjust the field of view of an active area 205 of the sensor 200. Further details of the lens 220 is explained in conjunction with FIGS. 4 and 5B. Depending on the type of the lens 220, the field of view of the sensor 200 may be widened or narrowed as needed. The embodiment of FIGS. 4 and 5B illustrate the field of view of the sensor 200 (or the field of view of the device 130) being narrowed to focus on the heat generating source (e.g., cooking plate, pot, pan, or the like) within the field of view.

In some embodiments, the device 130 includes an alert device 280 configured to signal one or more users of danger caused by heated objects through a notification signal based on various thresholds (e.g., multiple levels of temperature thresholds and multiple levels of presence thresholds). For example, the alert device 280 may flash or flicker a red light to indicate that the cooking plate 140 is above a certain threshold temperature that can cause harm to the user without any sound. In some instances, the alert device 280 can sound the alarm when the device 130 determines that a user or a part of the user is getting close to a heated object or objects that is above a certain threshold temperature that can cause harm to the user. Other methods may be used besides sound or display to signal the user. The methods can be used alone or in combination. For instance, the alert device 280 may sound the alarm as well as flicker light to indicate that an object is hot and dangerous.

In some embodiments, the alert device 280 is configured to sound an alarm based on one or more temperature levels (or temperature thresholds). For example, a first threshold temperature indicative of a first risk (e.g., mild danger due to heat) and a second threshold temperature indicative of a second risk (e.g., serious danger due to heat) that has a higher temperature than the first threshold temperature may be set through the processor 210 so that when the cooking plate's temperature reaches a temperature level between the first and second threshold temperature, a first alarm goes off. If the cooking plate's temperature reaches a temperature level above the second threshold temperature, a second alarm that is different from the first alarm goes off. If the cooking plate's temperature fails to reach a temperature level above the first threshold temperature, no alarm will go off.

Similarly, in some embodiments, the alert device 280 is configured to sound an alarm based on presence detection detected through the sensor 200.

The processor 210 includes various circuitry (e.g., 230, 240, 250, and 260) to perform the functions of remote temperature measurement and presence detection. These various circuitry may be incorporated within the processor 210 as shown in FIG. 3 or may be located outside of the processor 210 as a separate component or device and operatively coupled to the processor 210 to perform the functions described herein. Further, the functions of remote temperature measurement and presence detection may also be implemented through software.

The term "processor" may include any electrical circuitry, features, components, an assembly of electronic components or the like. That is, this term broadly encompasses any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "processor."

In some embodiments, the various processors, circuits, sub-circuits described herein may be included in or otherwise implemented by processing circuitry such as a microprocessor, microcontroller, or the like.

For instance, the processor 210 includes a temperature determination circuit 230. The temperature determination circuit 230 is configured to receive sensor data (e.g., infrared data received from the sensor 200) and process the sensor data to output temperature measurement of one or more objects that are captured within the field of view of the sensor 200. The temperature determination circuit 230 is also configured to detect the temperature of at least one of the circuits within the processor 210. For example, the temperature determination circuit 230 can measure the temperature of an ASIC implemented within the processor 210. ASIC is one example of implementing the various circuits and functions within the processor 210. As mentioned, a person of ordinary skill in the art will readily appreciate that the functions can be implemented using other processor-based devices. In order to measure the temperature of, for example, an ASIC, the temperature determination circuit 230 may include any suitable temperature measurement module or sensor.

The sensor data obtained from the sensor 200 includes raw infrared data. The raw infrared data include infrared light, intensity of infrared signals, or intensities of infrared wavelengths. In one embodiment, the raw infrared data includes numerical values indicative of infrared intensity. The term "raw" is used in the sense that these numerical values are not temperatures that can be described in Celsius or Fahrenheit. The temperature determination circuit 230 receives the infrared signals in the infrared light and translates the raw infrared data to a temperature represented in Celsius or Fahrenheit. In one embodiment, Analog-to-Digital Converters (ADCs) may be used to translate the intensities of infrared signals to a temperature value.

Below is an example formula in the art for determining a temperature of an object ($T_{obj}$) based on raw infrared data obtained from an object ($T_{objraw}$).

Formula 1
$$Tobj(°C.)_i = \sqrt[4]{\frac{Tobj_{raw}}{(\varepsilon * k) * (1 + Ga * (Tobj(°C.)_{i-1} - 25) + Fb * (Tasic - 25))} + (Tasic + 273.15)^4} - 273.15 - \text{Offset}$$

A person of ordinary skill in the art will readily appreciate and understand the above formula and its variables including coefficients. For example, ε indicates emissivity of an object, Offset indicates the amount of offset, $T_{asic}$ indicates the temperature of the ASIC included in the processor 210, and k, Ga, Fb are coefficients which are known or can be obtained empirically, and if i==0 then $Tobj(°C.)_{i-1}=25$ (°C.).

The processor 210 also includes a first compensation circuit 240. The first compensation circuit 240 is configured to compensate for the discrepancies of a temperature of an object within the field of view of the sensor 200 caused by the increase in the temperature of the ASIC in the processor 210.

Figure 7:
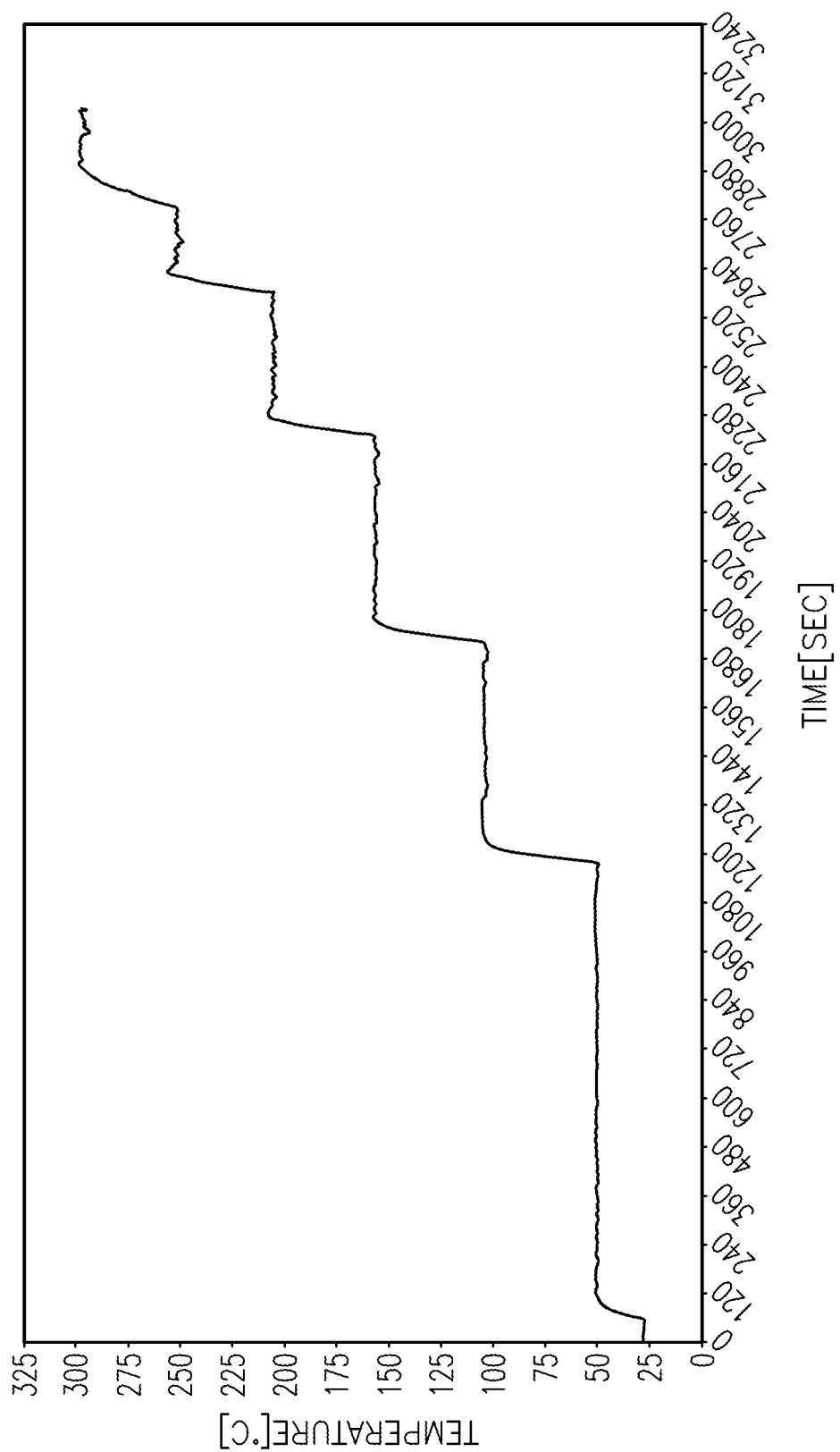
FIGS. 7 and 8 illustrate a sample experiment to assess the degree of a heat generating source contributing to the rise of temperature of a processor in a device.
Figure 8:
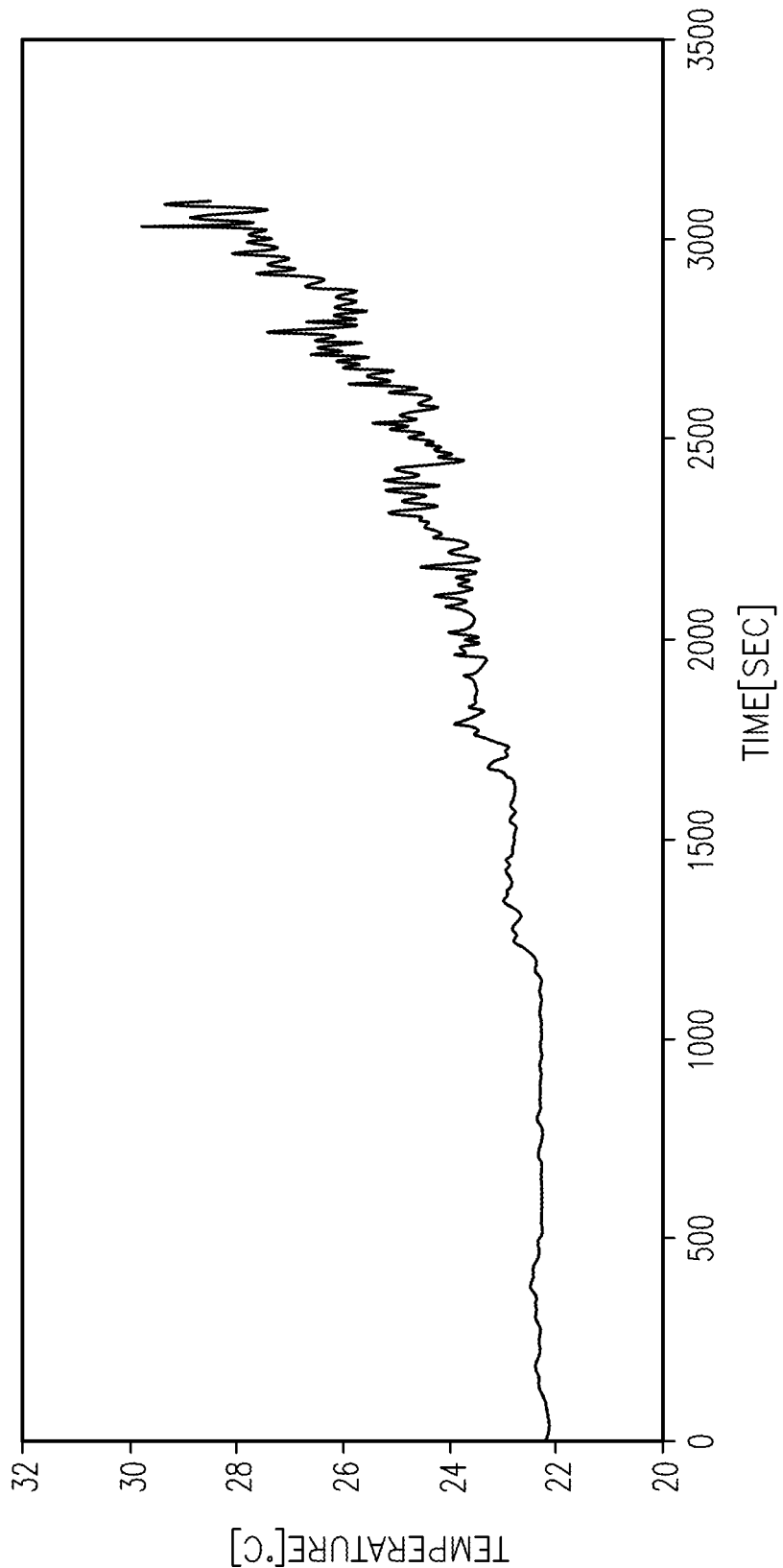

FIGS. 7 and 8 illustrate a sample experiment conducted by the inventors of the present disclosure to assess the degree of a heat emission contributing to the rise of temperature of a processor (for instance, an ASIC) in a device 130.

In FIG. 7, a temperature of a cooking plate (for example, 140A) is set at 25° C., 50° C., 100° C., 150° C., 200° C., and 300° C. at different times. The temperature of the cooking plate is monitored from 0 seconds to about 3000 seconds.

FIG. 8 shows the change of temperature of the processor 210 or the ASIC included in the device 130 in the same period as FIG. 7 (e.g., from 0 seconds to about 3000 seconds). This temperature change over time is caused by the heat flow (e.g., 162, 142, 144, 172) which causes to raise the temperature of the processor 210 or the ASIC included in the device 130. Due to the location of the device which is likely going to be under a cooker hood 110, the heat flow from heat generating sources or structures (e.g., cooking plate, heated pot, heated pan, or the like) below the device 100 will cause the temperature rise of the device itself (e.g., sensor, processor, or the like). The temperature of the device itself (in particular, the temperature of the processor) is important in the relation of infrared exchange between the heat generating source and the sensor 200 for collecting infrared themselves.

In this regard, determining the temperature of the device (or the processor) is beneficial in accurately obtaining the temperature of the object within the field of view of the sensor. For instance, the change in the collected infrared could be caused by the temperature change of the processor inside the device. That is, the objects within the field of view might not have changed in temperature at all and it is the processor inside the device that is changing in temperature. Accordingly, it is beneficial for the temperature of the processor (or ASIC) to be compensated for accurate temperature measurement as the processor could be also changing in temperature as shown in FIG. 8.

As mentioned, the temperature rise in the processor 210 itself causes the inaccurate determination of the temperature of the actual object under detection. Accordingly, the first compensation circuit 240 compensates the rise of temperature of the processor caused by the heat flow from various heated sources within the field of view. Below is Formula 2 which is a modification made on top of Formula 1 to compensate for the rise of temperature in the components of the processor 210 (e.g., ASIC).

$$Tobj(°C.)_i = \sqrt[4]{\frac{Tobj_{raw} - (m*Tasic + c)}{(\varepsilon*k)*(1 + Ga*(Tobj(°C.)_{i-1} - 25) + Fb*(Tasic - 25))} + -(Tasic + 273.15)^4}$$

273.15 − Offset

Formula 2

Here, the first compensation circuit 240 internally compensates the temperature of the ASIC (e.g., $T_{asic}$). Here, m and c are coefficients that are known or can be obtained empirically. For example, the coefficients are identifiable based on the characteristics of the materials (e.g., the type of materials, emissivity of the materials, and other properties of the materials) around the cooking plate and within the field of view.

The temperature of the ASIC is linearly compensated from $T_{objraw}$ so that the outputted temperature of the object $T_{obj}$ is accurately represented. As described in Formula 2, one method of applying linear compensation is to subtract $(m*T_{asic}+C)$ value from $T_{objraw}$ in the numerator. In one embodiment, $T_{objraw}$ and $T_{asic}$ is an output of the ASIC.

The processor 210 further includes a second compensation circuit 250. The second compensation circuit 250 compensates by taking into account the emissivity of the various objects in the surroundings (or various objects within the field of view). Below is Formula 3 which is a modification made on top of Formula 2 to compensate for the emissivity of various objects within the field of view of the sensor 200.

$$Tobj(°C.)_i = \sqrt[4]{\frac{Tobj_{raw} - (m*Tasic + c)}{(\varepsilon*k_{corr}*k)*(1 + Ga*(Tobj(°C.)_{i-1} - 25) + Fb*(Tasic - 25))} + -(Tasic + 273.15)^4}$$

273.15 − Offset

Formula 3

Here, the second compensation circuit 250 internally compensates the value of emissivity ε*k based on surrounding objects by applying an additional correlation coefficient $k_{corr}$.

Every object emits thermal radiation depending on its temperature. Emissivity is the measure of an object's ability to emit infrared energy. Emitted energy indicates the temperature of the object. To be specific, the emissivity of the surface of a material is its effectiveness in emitting energy as thermal radiation. Thermal radiation is electromagnetic radiation that may include both visible radiation (light) and infrared radiation. Quantitatively, emissivity is the ratio of the thermal radiation from a surface to the radiation from an ideal black surface at the same temperature as given by the Stefan-Boltzmann law. The ratio varies from 0 to 1. For example, metallic surface like aluminum, copper, silver has emissivity close to 0. On the other hand, glass, water as well as human body have emissivity close to 1. The surface of a perfect black body (with an emissivity of 1) emits thermal radiation at the rate of approximately 448 watts per square meter at room temperature (25° C.). All real objects have emissivities less than 1.0, and emit radiation at correspondingly lower rates.

The radiation power of a black body is known and is given by Stefan-Boltzmann law. The Stefan-Boltzmann law describes the power radiated from a black body in terms of its temperature. Specifically, the Stefan-Boltzmann law states that the total energy radiated per unit surface area of a black body across all wavelengths per unit time j* (also known as the black-body radiant emittance) is directly proportional to the fourth power of the black body's thermodynamic temperature T: $j*=\sigma T^4$. The constant of proportionality σ, called the Stefan-Boltzmann constant, is derived from other known physical constants.

That is, based on the type of material, the emissivity of the material, and other known properties of the material, the temperature of these materials can be obtained through the processor based on the collected infrared data. As will be explained in connection with FIG. 9 later on, the properties of the material has to be additionally accounted for to produce an accurate temperature measurement. At point B of FIG. 9, it is shown that the temperature of the object $T_{obj}$ within the field of view of the sensor 200 drops from about 250 degrees to about 30 degrees based on placing an unheated pot 160 on top of a heated cooking plate 140. Accordingly, such consideration of the type of material, the emissivity of the material has to be made in order to accurately measure the temperature of the object $T_{obj}$ within the field of view.

For example, $k_{corr}$ is applied to ε and k. That is the ε*k value is further adjusted by $k_{corr}$ to output ε*k*$k_{corr}$ in the denominator. The objects in the surroundings are linearly compensated by ε*k*$k_{corr}$ so that the outputted temperature of the object $T_{obj}$ is accurately represented. As described in Formula 3, one method of applying compensation is to divide $T_{objraw}-(m*T_{asic}+c)$ value from ε*k*$k_{corr}$ along with other factors.

Any object or black body that comes within the field of view may emit infrared data. That is, the object does not necessarily have to be a cooking plate in order to emit heat. In the example shown in FIG. 9, the unheated pot partially blocked the emission of the cooking plate. Accordingly, the emissivity ε of the various objects within the field of view are adjusted additionally by the aforementioned correlation coefficient $k_{corr}$ (the surrounding materials' emissivity is compensated by $k_{corr}$).

In some cases, $k_{corr}$ is known by a manufacturer, as the manufacturer making the system 100 will know the range of the field of view of the device 130 included in the cooker hood and will also know what materials or objects comes within the field of view. That is, manufacturers know the materials used in their cooking appliances (e.g., cooking system). Accordingly, the type of material and the emissivity of the materials of the various parts of the cooking appliances can be easily obtained and considered. Here, the type of material and the emissivity of the material including pots and pans are also considered.

Emissivity includes hemispherical emissivity, spectral hemispherical emissivity, directional emissivity, spectral directional emissivity and the method of determining and calculating the emissivity of materials are known in the art. Further, emissivities of common surfaces arealso know in the art. For instance, an anodized aluminum has an emissivity of about 0.9, a polished copper has an emissivity of about 0.04, a human's skin has an emissivity from 0.97 to 0.999, and water (pure) has an emissivity of about 0.96. As such, $k_{corr}$ can be obtained to apply known compensations for those surrounding materials within the field of view.

By compensating for the rise of temperature of the processor itself and adjusting the emissivity of the surrounding materials within the field of view according to Formula 3, the sensor 200 is capable of detecting the temperature of an object from the range of about 25 degrees to about 800 degrees. Further, the accuracy is within about +5° C. of the actual temperature of the object throughout the range. The compensation of the temperature of the processor (e.g., ASIC) and the compensation of the surrounding materials provides a technical benefit of improving the accuracy of temperature measurement using infrared sensors.

Figure 9:
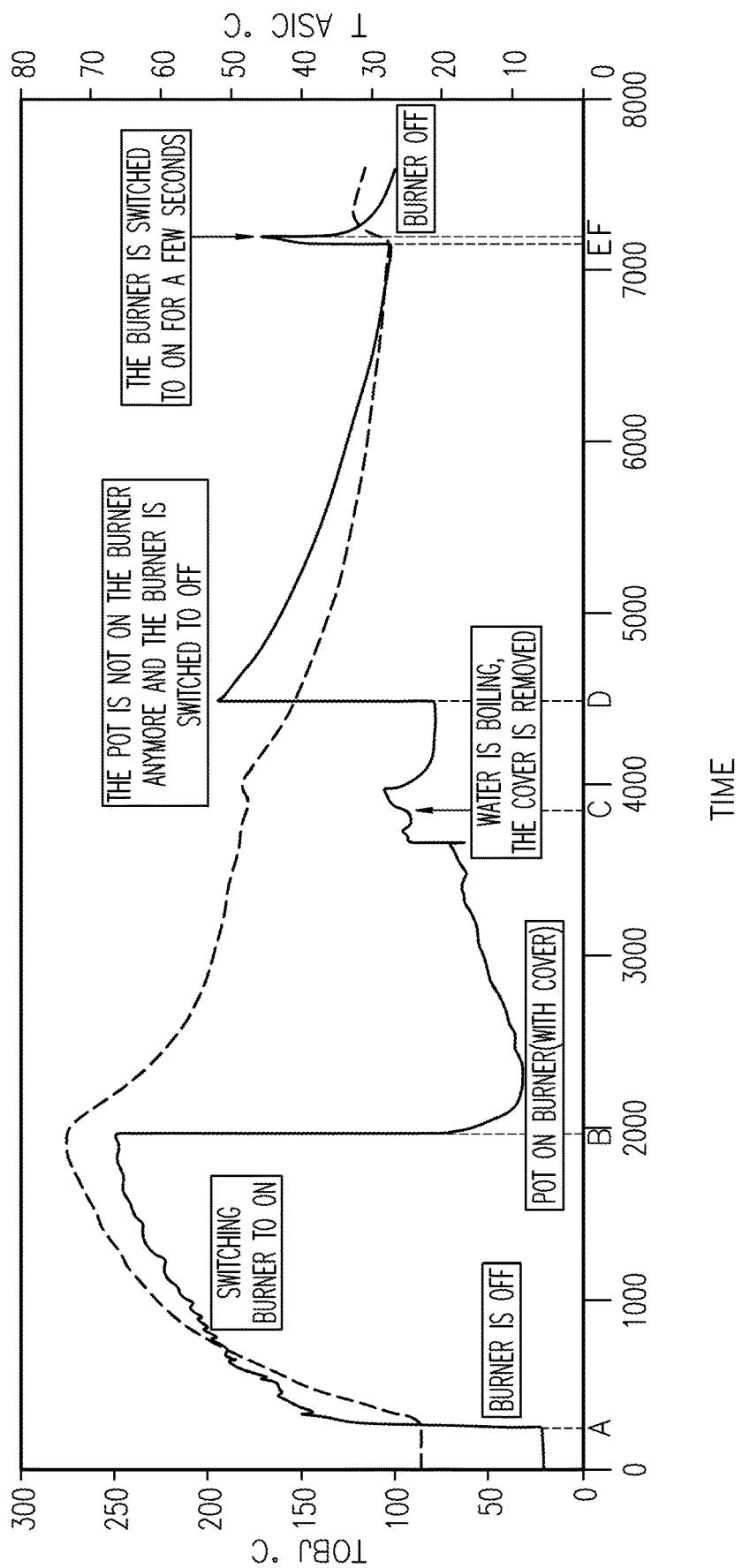
FIG. 9 is an example experiment conducted to both consider the rise of temperature of the processor due to the heat flow from the heated sources as well as the various objects within the field of view that additionally affect the temperature of an object under detection.

FIG. 9 is an example experiment conducted to both consider the rise of temperature of the processor (e.g., ASIC) due to the heat flow from the heated sources as well as the various objects within the field of view that additionally affect the temperature of an object under detection.

In FIG. 9, the bolded lines are shown to indicate the temperature of the object $T_{obj}$ under detection. The dotted lines are shown to indicate the temperature of the processor or the ASIC itself $T_{asic}$. The object may be a cooking plate 140 and any other cooking tools, kitchen utensils that come within the field of view of the sensor 200. In FIG. 9, a pot is used as an example of a cooking tool that is in the surrounding and within the field of view. However, this is a mere example and kitchen utensils, such as a stainless steel whisk, turner, spoon, tong, or the like can also be used as these objects also rise in temperature when heated up. As shown, various actions (e.g., actions A, B, C, D, E, F) are taking place within the timeframe of the experiment. Initially, the cooking plate is turned off and the cooking plate maintains a steady 25° C. Once the cooking plate is switched ON (action A), the temperature of the object, $T_{obj}$, which in this case is the cooking plate rises up. It is appreciated that the temperature of the ASIC, $T_{asic}$, within the device 130 is also increased. The ASIC had an initial temperature of about 25° C. but as the temperature of the cooking plate rises, the temperature of the ASIC also steadily rises from about 25° C. to about 70° C.

When a pot with a cover is placed on top of the cooking plate (action B), the temperature of an area where the cooking plate and the pot is disposed sharply drops. $T_{obj}$ shows that the temperature drops to about 30° C. That is, the temperature is adjusted according to the objects within the field of view. The pot has an emissivity $\varepsilon_{pot}$ but because the pot is unheated and cooled before being disposed on the heated cooking plate, in one embodiment, correlation coefficient $k_{corr}$ may be introduced to adjust.

As the cooking plate is continuously applied heat, the temperature of the pot rises and the water starts to boil about at 100° C. (action C). When the water in the pot starts to boil, the cover of the pot is removed. During the timeframe between action B and action C, it shows that the temperature of the ASIC gradually decreases from 70° C. to about 48° C. This is partially due to the fact that the direct heat flow from the pot does not affect the ASIC in the device 130.

When the pot is removed from the cooking plate (and outside of the field of view so that the temperature of the pot no longer affects the temperature of the object and the ASIC) and cooking plate is turned OFF (action D), an instant increase in temperature $T_{obj}$ is detected. That is, the temperature $T_{obj}$ rises up until about 200° C. and because the switch is no longer ON, the temperature steadily decreases. The temperature of the ASIC, $T_{asic}$, also steadily decreases.

The cooking plate is switched to ON (action E) for a few seconds and the cooking plate is switched OFF (action F). It is shown that the temperature of the ASIC, $T_{asic}$, is affected by this short temperature change as $T_{asic}$ rises from 28° C. to 33° C. before it starts to dropping again. The graph shows the close correlation between the temperature of the ASIC, $T_{asic}$ and the temperature $T_{obj}$ under sensing.

The example experiment shown in FIG. 9 illustrates the benefit of considering the various objects within the surroundings as well as the temperature of the ASIC in accurately determining the temperature of an object within the field of view. Application of these findings are found in Formula 3 as described above.

The processor 210 also includes a presence determination circuit 260 that is configured to detect presence or absence of a user based on the collected infrared data form the sensor 200. The presence determination circuit 260 includes presence detection algorithms that processes the same infrared data for determining temperature. The presence detection algorithm implemented within the presence determination circuit 260 will be explained in conjunction with FIGS. 10, 11, 12, and 14.

In some embodiments, the processor 210 may include a communication circuit 270 capable of performing communication with another device or with an external server. For example, the first device 130A can communicate information (e.g., collected infrared data of the materials within its field of view) with the second device 130B so that any heated objects within the overlapping area 135 are not taken into account twice by the first and second device 130A, 130B as shown in FIG. 2.

The communication circuit 270 can be implemented by utilizing various communication schemes know in the art including but not limited to Wi-Fi, Bluetooth, Zigbee, 5G, LTE, or the like.

Referring to FIG. 4, FIG. 4 is a side view of a device having a lens according to some embodiments of the present disclosure. FIG. 4 also includes an enlarged view of the lens coupled to the device.

In some embodiments, a lens 220 is coupled to a device 130 to narrow the field of view of a device 400 or a system 400. The system 400 in FIG. 4 is substantially similar to the system 100 in FIG. 2 except that the device 130 in system 400 includes a lens 220 coupled to the device.

In FIG. 4, a lens 220A coupled to the first device 130A has a first field of view $\theta_1$. This first field of view $\theta_1$ is narrower than the field of view of the first device 130A shown in connection with FIG. 2. Similarly, a lens 220B coupled to the second device 130B has a second field of view $\theta_2$. In some embodiments, the lens 220B is identical to the lens 220A and the second field of view $\theta_2$ is substantially identical to the first field of view $\theta_1$. However, in other embodiments, the lens 220B may be different from the lens 220A and accordingly, the second field of view $\theta_2$ may be different from the first field of view $\theta_1$.

One benefit of the lens or any other structure suitable for performing the function of the lens is that the field of view is narrowed and the objects within the field of view is reduced. This increases the accuracy of the temperature of one or more objects detected within the field of view of the sensor. Another benefit is that the application of a lens enables extending the sensor's reach.

In FIG. 4, the pot 160 with the cover is on the first cooking plate 140A. Depending on whether the pot 160 was initially heated or cooled, the heat flow 402 radiated from the pot 160 and the first cooking plate 140A. The example of temperature of the object (e.g., cooking plate, pot) within the first field of view temporarily dropping was explained in connection with FIG. 9 when the pot is unheated prior to being placed on top of the heated cooking plate.

The heat flow 404 radiated from the pan 170 and the second cooking plate 140B is also detected in a similar manner at the second device 130B. As shown in the enlarged view of the sensor device 130B having the lens 220B, the lens 220B is arranged on top of the sensor 200. The cross-sectional view of the device 130 with a lens 220 and without a lens will be described in conjunction with FIGS. 5A and 5B below.

Figure 5A:
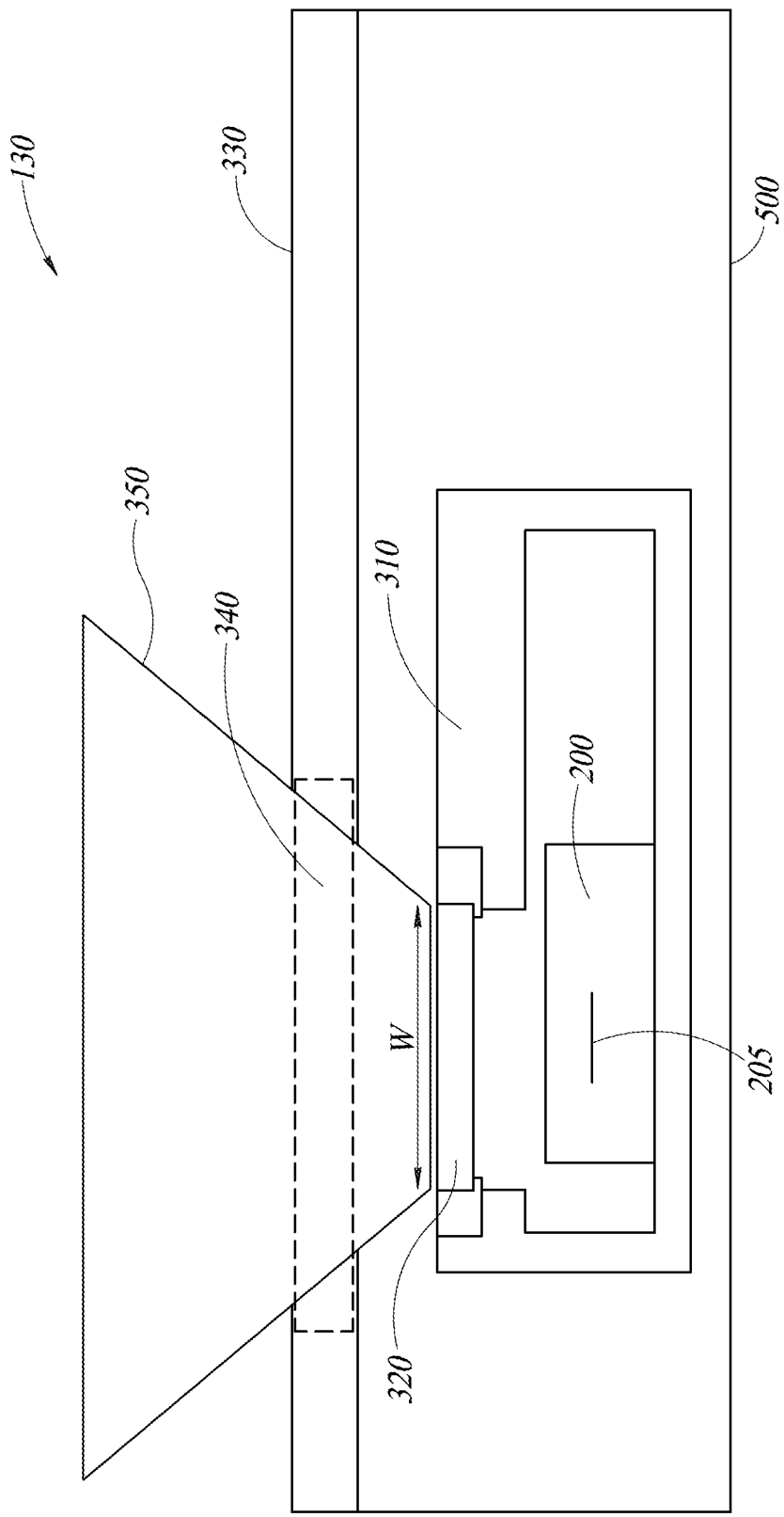
FIG. 5A is a cross-sectional view of a device according to some embodiments of the present disclosure.
Figure 5B:
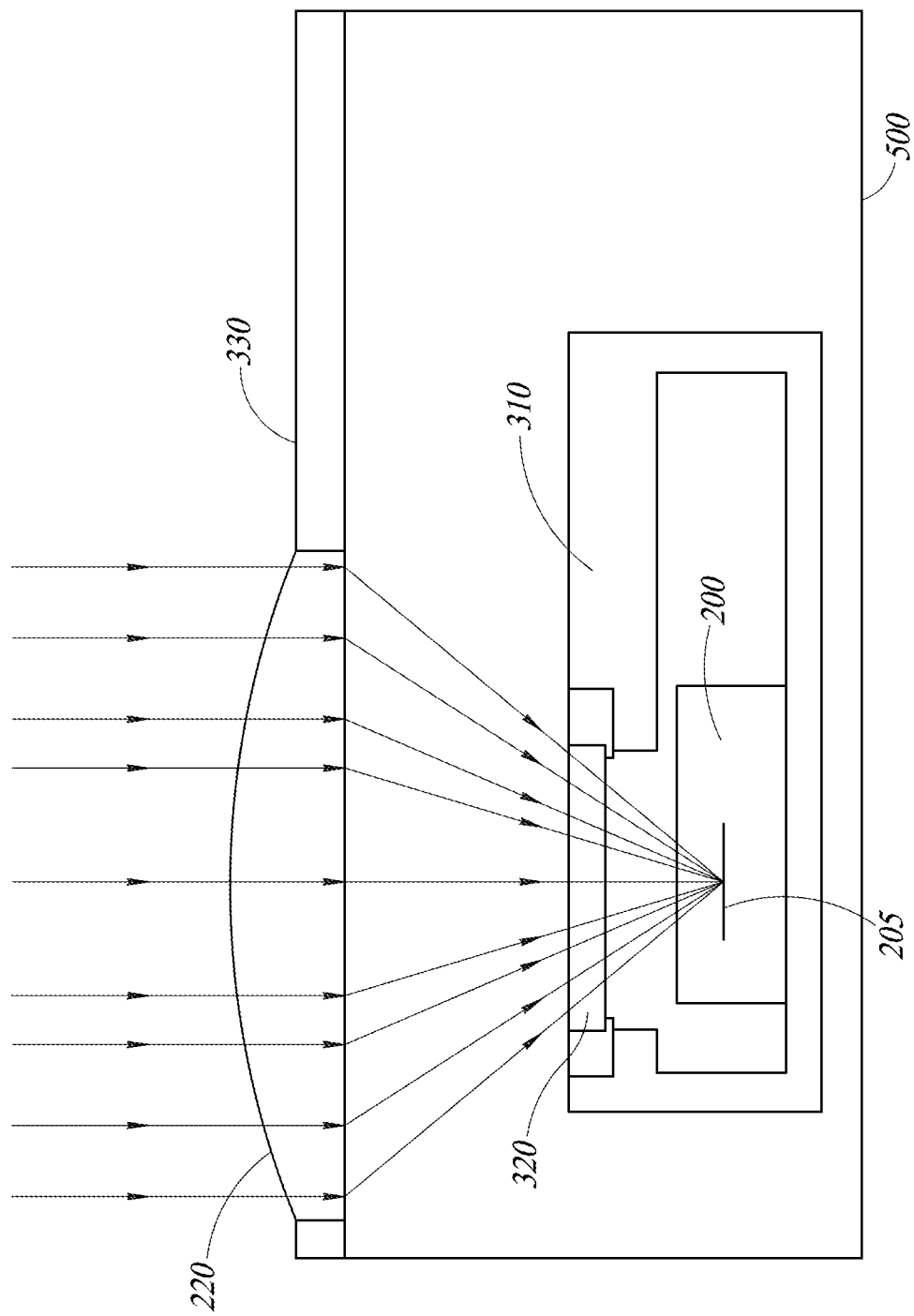
FIG. 5B is a cross-sectional view of a device having a lens mounted on a sensor according to some embodiments of the present disclosure.

FIG. 5A is a cross-sectional view of a device according to some embodiments.

The cross-sectional view of the device 130 shows a sensor 200. The sensor is included in a package 310 that has a window 320 for receiving sensed data. A cover 330 is over the package 310 of the sensor 200. The cover 330 includes an exposure hole 340 that is wider than a width W of the window 320 of the package 310. The rest of the package 310 is surrounded by a housing 500. In some embodiments, the housing 500 and the cover 330 may be integrally formed and does not have to be a separate component. The sensor 200 is housed in a package (or housing) 500 to protect the sensor 200 from unwanted radiation. The window on top is closed with, for example, a silicon window 320 which is transparent for thermal radiation.

The field of view 350 of the sensor 200 is illustrated as a circular sector but a person of ordinary skill in the art would readily appreciate that the field of view 350 has a cone shape.

The cover window 320 can provide physical protection of a sensor module 200, including dust prevention. The exposure hole 340 is appropriately arranged considering various geometrical constraints in order to avoid the field of view limitation.

The IR sensor which is one example of the sensor 200 is able to detect radiation emitted by a body at a certain temperature according to black-body emission Plank's law. The sensor 200 collects IR radiation without any obstacles to the radiation optical path. This feature enables the sensor 200 to operate as a human presence and motion sensor in different application contexts such as alarm systems, anti-intruder systems, smart lighting, and room occupancy. In some embodiments, the sensor 200 has high sensitivity for working as a presence and motion sensor. The sensor 200 is also capable of detecting temperature remotely as previously explained. The sensor 200 may be also be implemented with an integrated silicon IR filter.

An example IR sensor according to one embodiment of the present disclosure measures in the wavelength range from about 5 to 15 µm. Human body peak radiation is about 9.8 µm, therefore it is about in the center of IR bandwidth, which makes it capable of detecting presence through infrared signals. The method of how the sensor according to the present disclosure detects both temperature measurement and object presence will be further explained below.

FIG. 5B is a cross-sectional view of a device having a lens mounted on a sensor according to some embodiments.

The difference between FIG. 5B and FIG. 5A is that a lens 220 is disposed on a cover 330. That is, in place of the exposure hole 340 in FIG. 5A, the lens 220 is disposed. The lens 220 is further centered on the cover window 320 so that any data collected through the lens 220 is gathered at an active area 205 of a sensor 200. That is, the lens 220 collects the data or radiation (e.g., IR radiation) and provides to the active area 205 of a sensor 200. A lens 220 can be used as a collector to focus the intercepted radiation on the sensor active area 205. One example of a lens 200 includes a plano-convex lens.

Figure 6A:
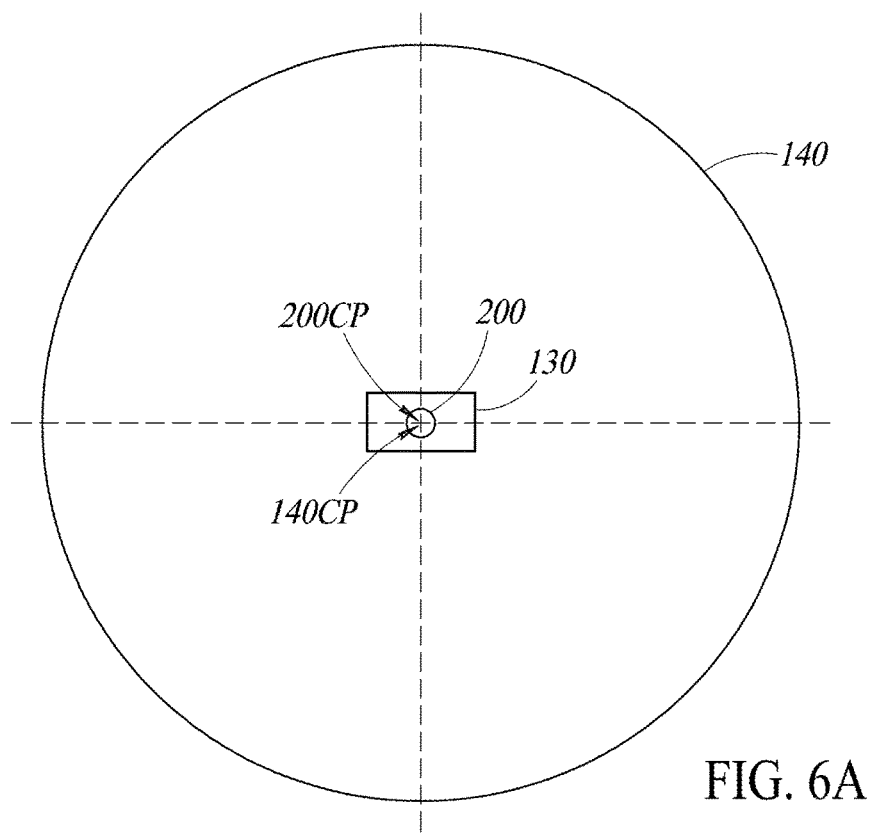
FIG. 6A is a top view showing a positional relationship between a cooking plate and a sensor.

FIG. 6A is a top view showing a positional relationship between a cooking plate and a sensor. In some embodiments, a center 200CP of a sensor 200 is aligned with a center 140CP of a cooking plate 140. That is, when seen from a top view, the center 200CP of the sensor 200 is substantially aligned or exactly aligned with the center 140CP of a cooking plate 140. More specifically, when seen from a top view, the center 200CP of an active area 205 of the sensor 200 is substantially aligned or exactly aligned with the center 140CP of a cooking plate 140.

Figure 6B:
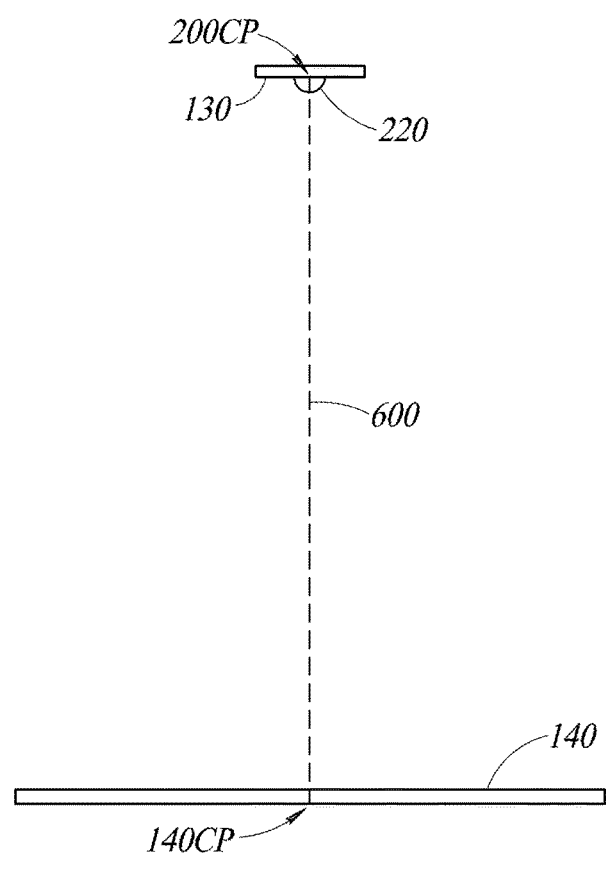
FIG. 6B is a side view showing a positional relationship between a cooking plate and a sensor.

FIG. 6B is a side view showing a positional relationship between a cooking plate and a sensor. As shown, an imaginary perpendicular line 600 is shown to indicate that a center 200CP of an active area 205 of a sensor 200 is aligned with a center 140CP of a cooking plate 140. In some embodiments, having the sensor 200 aligned with the cooking plate 140 may improve the accuracy of the temperature detection.

Figure 10:
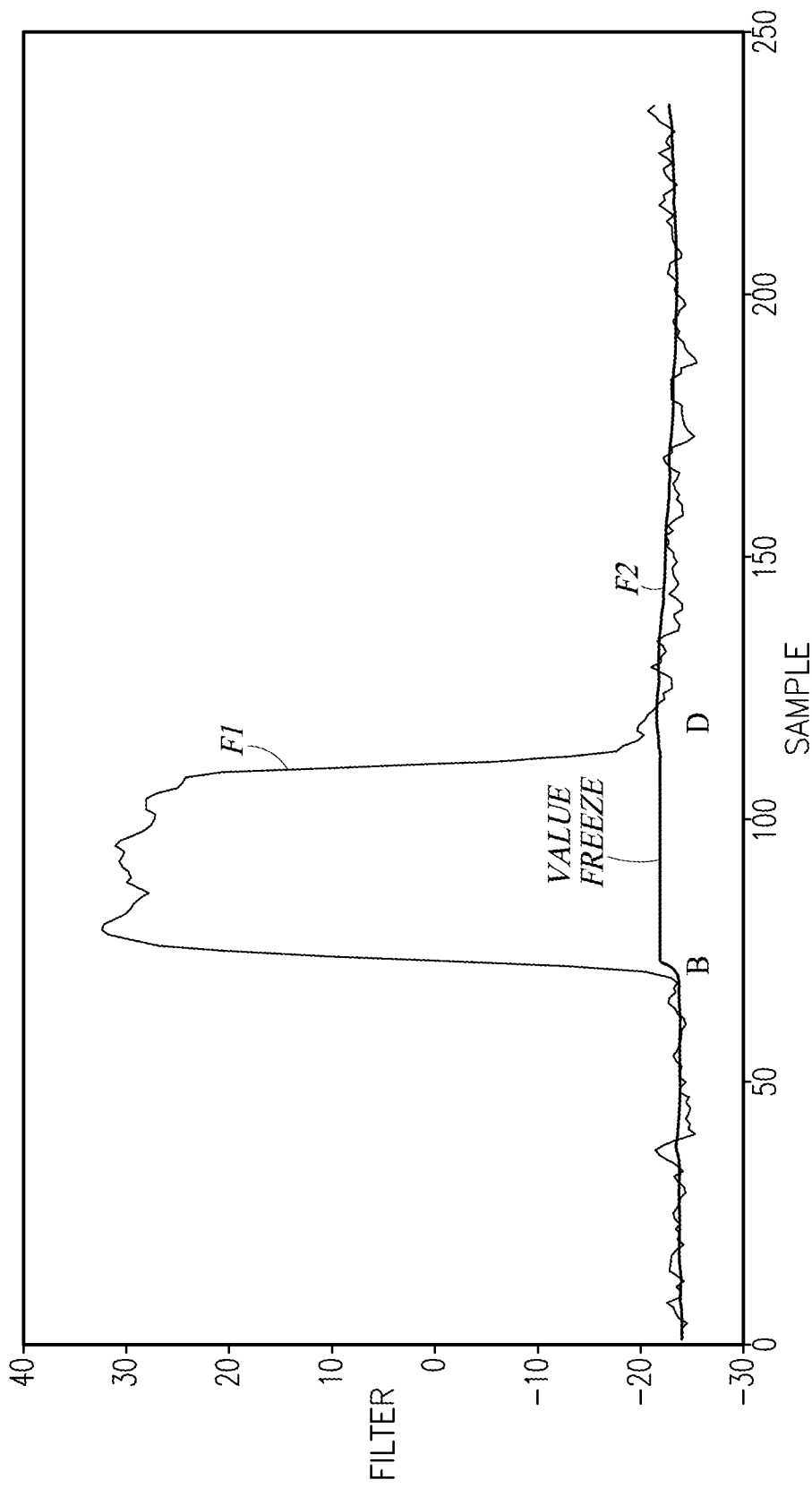
FIG. 10 illustrates sample filters used in presence detection according to some embodiments of the present disclosure.
Figure 11:
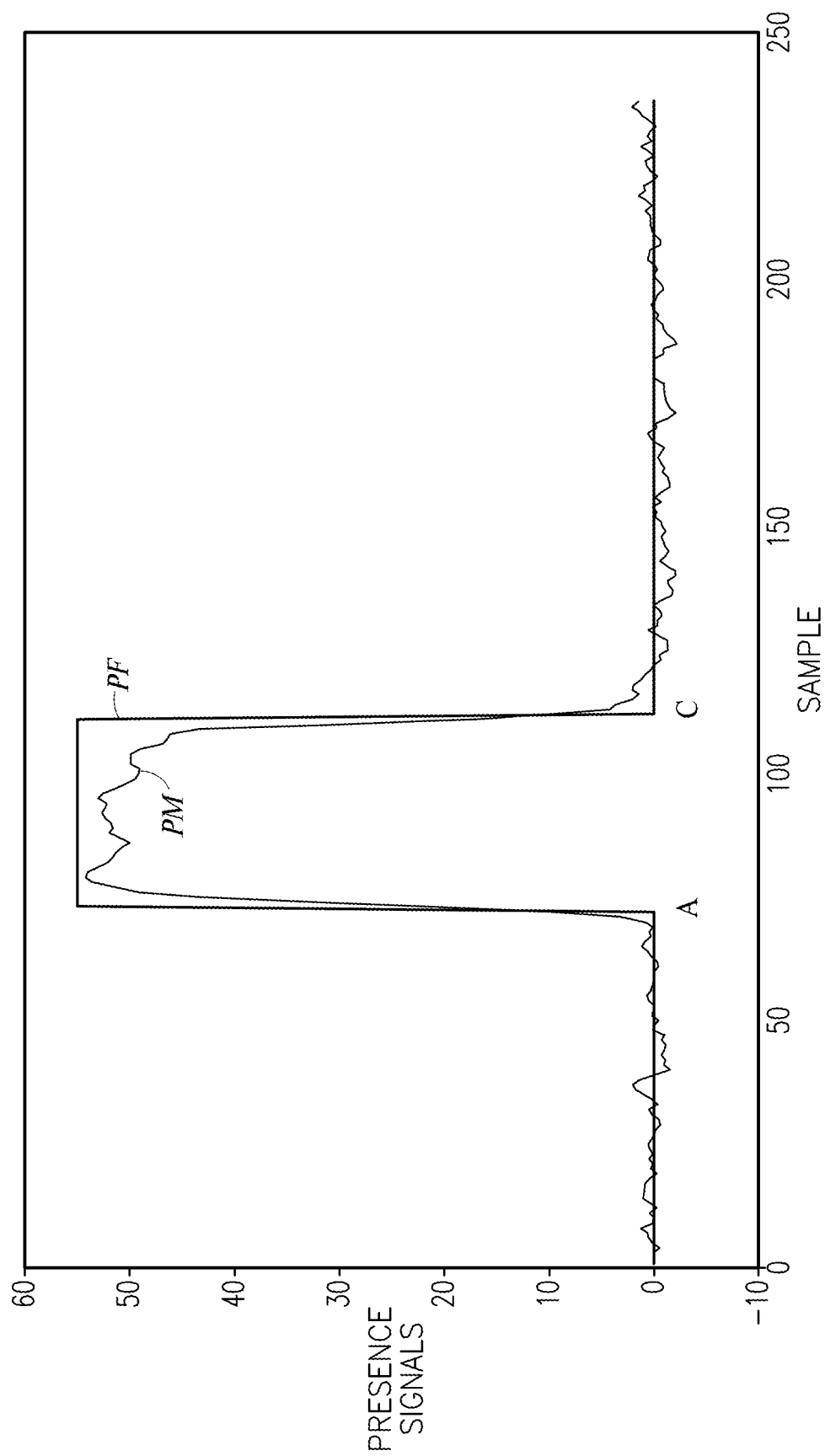
FIG. 11 illustrates a presence filter based on the sample filters shown in FIG. 10.
Figure 12:
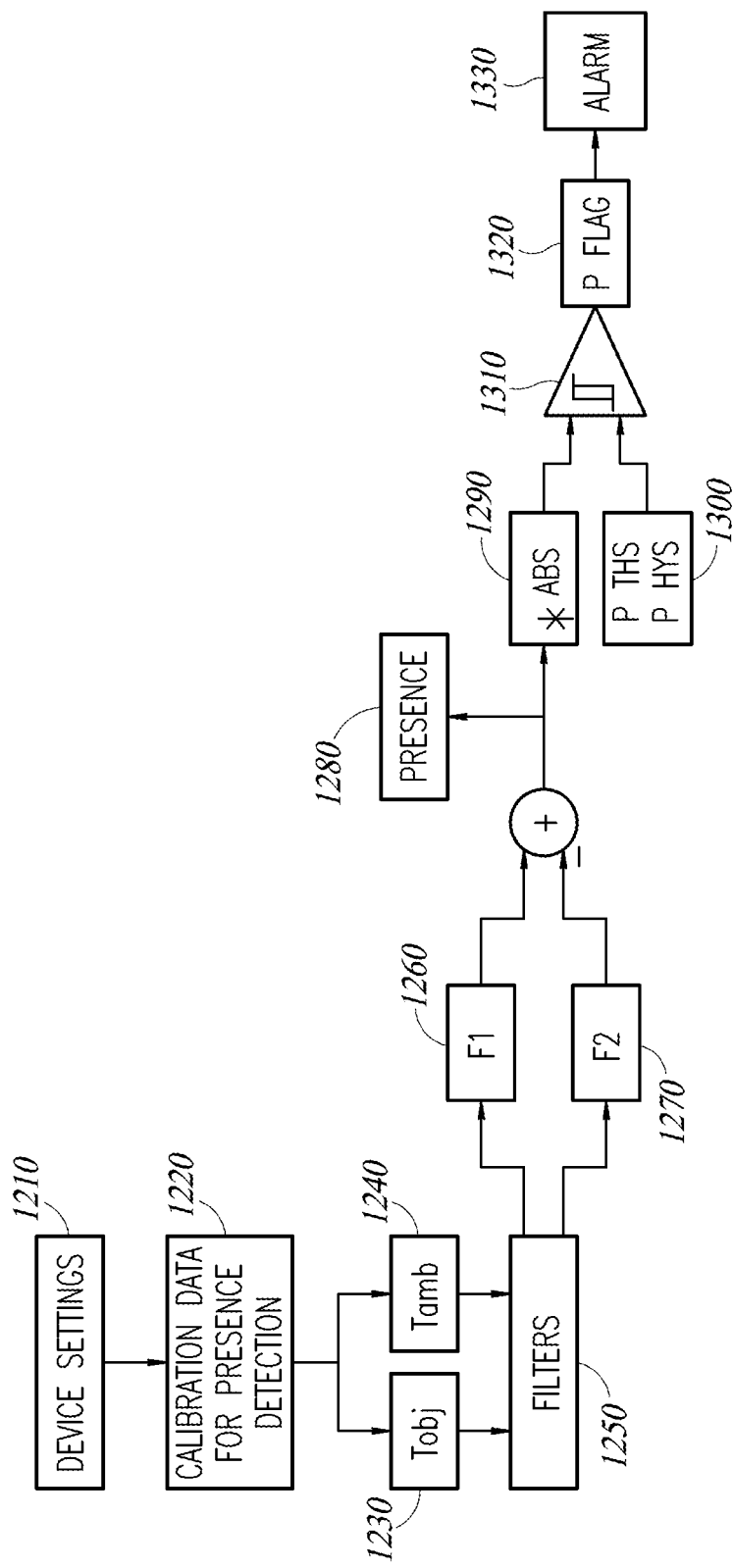
FIG. 12 illustrates a sample flow of the process of presence detection according to some embodiments of the present disclosure.

FIG. 10 illustrates sample filters used in presence detection according to some embodiments of the present disclosure. FIG. 11 illustrates a presence filter based on the sample filters shown in FIG. 10. FIG. 12 illustrates a sample flow of the process of presence detection according to some embodiments of the present disclosure.

One of the technical benefits of the present disclosure is that based on the same raw infrared data used for remote temperature measurement can be used for detecting presence. FIGS. 1-9 have been explained from a perspective of a remote temperature measurement. That is, the raw infrared data has been processed so that the processor converts the raw infrared data and outputs a temperature value of one or more objects. However, as mentioned above, the same data collected from the TMOS IR sensor or simply sensor 200 can be used for presence detection based on a presence algorithm (see FIG. 12) according to one or more embodiments of the present disclosure. The presence algorithm is implemented in the presence determination circuit 260. That is, the raw infrared data is processed so that a presence within the field of view of the sensor is detected based on the same raw infrared data used for determining the temperature of one or more objects. This is further illustrated in connection with FIG. 14.

The functions and the features described below are implemented in the presence determination circuit 260 as presence algorithms.

Referring to FIG. 12, at 1210, initially the settings of the device 100 is established. The settings of the device 100 includes, but are not limited to, a sampling rate (ODR; output data rate), gain, etc. For example, ODR which is the rate at which a sensor obtains new measurements, or samples can be measured in number of samples per second (Hz). In one embodiment, the ODR may be set to 8 Hz and the gain may be set to 16. However, this is merely an example number and the sampling rate, gain, and other values can be set different to achieve different performance of the device 100. For example, the ODR and the gain may be adjusted to be more sensitive or less sensitive as needed.

At 1220, raw infrared data (e.g., intensity of infrared signals) are obtained by the sensor 200 for using the data as presence detection. As noted, the same raw infrared data is used to determine the temperature of an object. Accordingly, the settings for the device 100 is the same with ODR at 8 Hz and gain at 16. The device settings do not have to altered or the type of raw infrared data does not have to be collected again to perform both functions of remote temperature measurement and presence detection.

At 1230, the temperature of the object ($T_{obj}$) is obtained through the sensor 200 and at 1240, the ambient temperature ($T_{amb}$) is obtained through the sensor 200. For example, here, a chip included in the device 100 amplifies the IR signal, and converts it to digital and further provides the two main parameters, $T_{amb}$ and $T_{obj}$ described above. Namely, $T_{amb}$ is the temperature of the sensor that is ambient temperature in steady state condition, $T_{obj}$ is the signal proportional to the IR radiation that reaches the field of view of the sensor 200. The ambient temperature $T_{amb}$ and the object temperature $T_{obj}$ is separately obtained in order to detect the presence of both a still subject and a moving subject. Ambient temperature is given less weight or low sensitivity as compared to the temperature of an object. Method of measuring ambient temperature temperature is well-established in the related art. Obtaining both the ambient temperature $T_{amb}$ and the object temperature $T_{obj}$ from the sensor 200 enables the presence determination circuit 260 to determine whether there is a presence of a subject (e.g., user, part of a user such as arm, hand) as well as if they are still or moving. These temperature data for $T_{obj}$ and $T_{amb}$ are applied with filters at 1250. In one embodiment, certain filters are applied to the collected raw infrared data by the sensor 200 at 1260 and at 1270. One example filter is a first low pass filter F1 and a second low pass filter F2 which is also shown in FIG. 10. When a subject (e.g., a user, or a part of the user) is moving within the field of view of the sensor 200, the first low pass filter F1 and the second low pass filter F2 is applied to the infrared data collected based on the subject's movement within the field of view. Then the difference of the output from the two filters is obtained at 1280. This is shown as a presence filter PM in FIG. 11 which is, in one embodiment, a subtraction between the first low pass filter F1 and the second low pass filter F2. That is, presence filter for processing presence signals are generaed based on a difference between an outcome of applying the first low pass filter F1 to the infrared data and an outcome of applying the second low pass filter F2 to the same infrared data.

The presence determination circuit 260 further computes the absolute value (ABS*) of the presence filter PM producing presence signals at 1290. Then at 1310, the presence determination circuit 260 compares the absolute value of the presence filter PM with the various thresholds (e.g., presence threshold $P_{THS}$ and hysteresis threshold $P_{HYS}$ at 1300). In one embodiment, the presence signals are compared with a difference of a presence threshold and a hysteresis threshold to determine a presence of a subject with the field of view.

Presence flag PF or P Flag is a logic value of 0 and 1 where 0 indicates no presence and 1 indicates presence. At 1320, the presence signals from the presence filter PM are compared with the presence threshold $P_{THS}$ and hysteresis threshold $P_{HYS}$ and if there is presence, a logic value of 1 is output. If there is no presence, a logic value of 0 is output.

For example, the presence determination circuit may determine that a subject is present when the presence signals are greater than the difference of the presence threshold and the hysteresis threshold. On the other hand, the presence determination circuit may determine that the subject is absent when the presence signals are smaller than the difference of the presence threshold and the hysteresis threshold. Based on the output, an alarm may sound if the value is 1 at 1330. In particular, a notification signal may be transmitted from the presence determination circuit to the alert device 280 in response to the presence signals being greater than the difference of the presence threshold and the hysteresis threshold. On the other hand, if the value is 0, the alarm will be disabled.

The example algorithm for presence detection is further explained in connection with FIGS. 10 and 11. In one embodiment, two thresholds are introduced in order to accurately detect a presence of a subject. A first threshold is a presence threshold $P_{THS}$. When the presence signal as shown in FIG. 11 is above the presence threshold $P_{THS}$, then the processor determines that there is a presence of a subject within the field of view. Another threshold considered is the hysteresis threshold $P_{HYS}$. The hysteresis threshold $P_{HYS}$ is provided to account for the oscillation in the presence signals (see 0 to A and C to 240 in FIG. 11). That is, a second threshold, $P_{THS}$-$P_{HYS}$, is further taken into account for avoiding oscillation of the presence signals around a threshold value. That is, for example, the processor may erroneously determine that a presence is detected whenever the presence signal slightly goes above the threshold value (e.g., presence threshold $P_{THS}$) due to the oscillation of the presence signals caused by noise. Accordingly, the second threshold, $P_{THS}$-$P_{HYS}$, reduces the problem of oscillation in presence signals to improve the accuracy of presence detection.

Referring to FIG. 11, when the presence signal is greater than $P_{THS}$ (see A of FIG. 11) and the output of a presence flag PF in the previous measurement is 0 (which is indicative of no presence detected), the value of the low pass filter F2 will be frozen (see B of FIG. 10) and presence flag PF will go to 1 (which is indicative of presence). While the presence flag PF is 1 (for example, between A and C in FIG. 11), the input for the low pass filter F2 may remain as a constant value ("Value Freeze") and the output of the low pass filter F2 will be constant. When the presence flag PF goes to 0 (see C at FIG. 11) and the presence signal will be lower than $P_{THS}$-$P_{HYS}$ at point C (see FIG. 11). From this instant (at point D at FIG. 10) the low pass filter F2 may be free to evolve with $T_{obj}$ as input.

The aforementioned method is one example method of detecting presence. Other various method may be used by the IR sensor to detect presence. For example, if an object with emissivity close to 1 is covering the entire field of view of the sensor, then the $T_{obj}$ will be proportional of the object temperature. As previously mentioned, human body has an emissivity close to 1, which allows the IR sensor to detect presence of a human body. If the temperature of the object is higher than ambient temperature $T_{amb}$, then $T_{obj}$ will be positive. If the temperature of the object is lower than ambient temperature $T_{amb}$, then $T_{obj}$ will be negative. Further, if the emissivity of the object in front of the sensor is zero, then $T_{obj}$ is expected to be approximatively zero according to imposed calibration.

Figure 13:
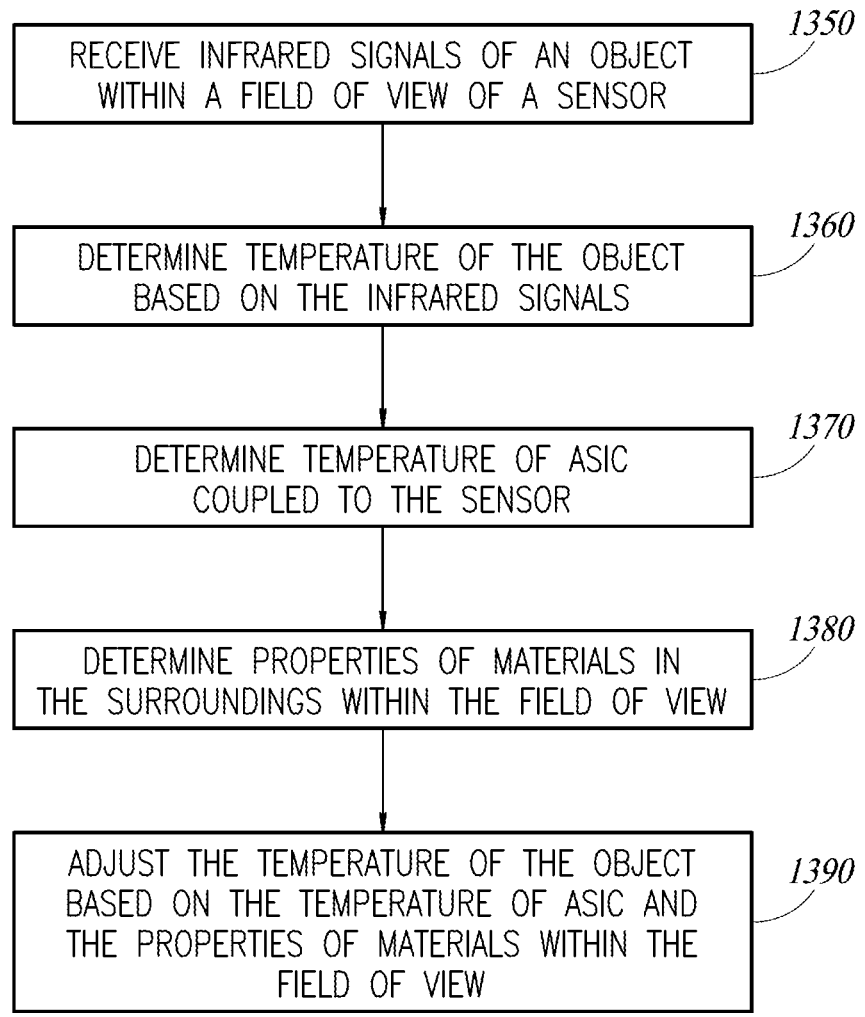
FIG. 13 is a flow chart according to a temperature compensation method according to some embodiments of the present disclosure.

FIG. 13 is a flow chart according to a temperature compensation method according to some embodiments of the present disclosure.

At 1350, infrared signals are collected using a sensor. The infrared signals are broadly used herein to indicate any suitable signals from infrared light that is used at the sensor 200 for measuring temperature of an object (or objects) within the field of view of the sensor 200. One example of infrared signals may include infrared light, infrared wavelengths, intensities of infrared wavelengths, or the like.

At 1360, the temperature of the object is determined using the temperature determination circuit 230 based on a raw infrared data including infrared signals and the properties of infrared signals such as intensity.

At 1370, the temperature of a processor 210 or if it is implemented using an ASIC, the temperature of the ASIC, is measured using the temperature determination circuit 230. The temperature of the ASIC is used by the first compensation circuit 240 to compensate the temperature of the object based on the rise of temperature in the ASIC. This process is explained at 1390.

At 1380, the properties of materials in the surroundings within the field of view of the sensor 200 is also determined. These properties which include the type or materials and the emissivity of the materials are taken into account and used by the second compensation circuit 250.

At 1390, the temperature of the object within the field of view of the sensor is adjusted based on the temperature of the ASIC and the properties of materials in the surroundings within the field of view of the sensor 200. The first and second compensation circuit determines the degree of compensation and outputs the temperature of the object based on Formula 3.

Figure 14:
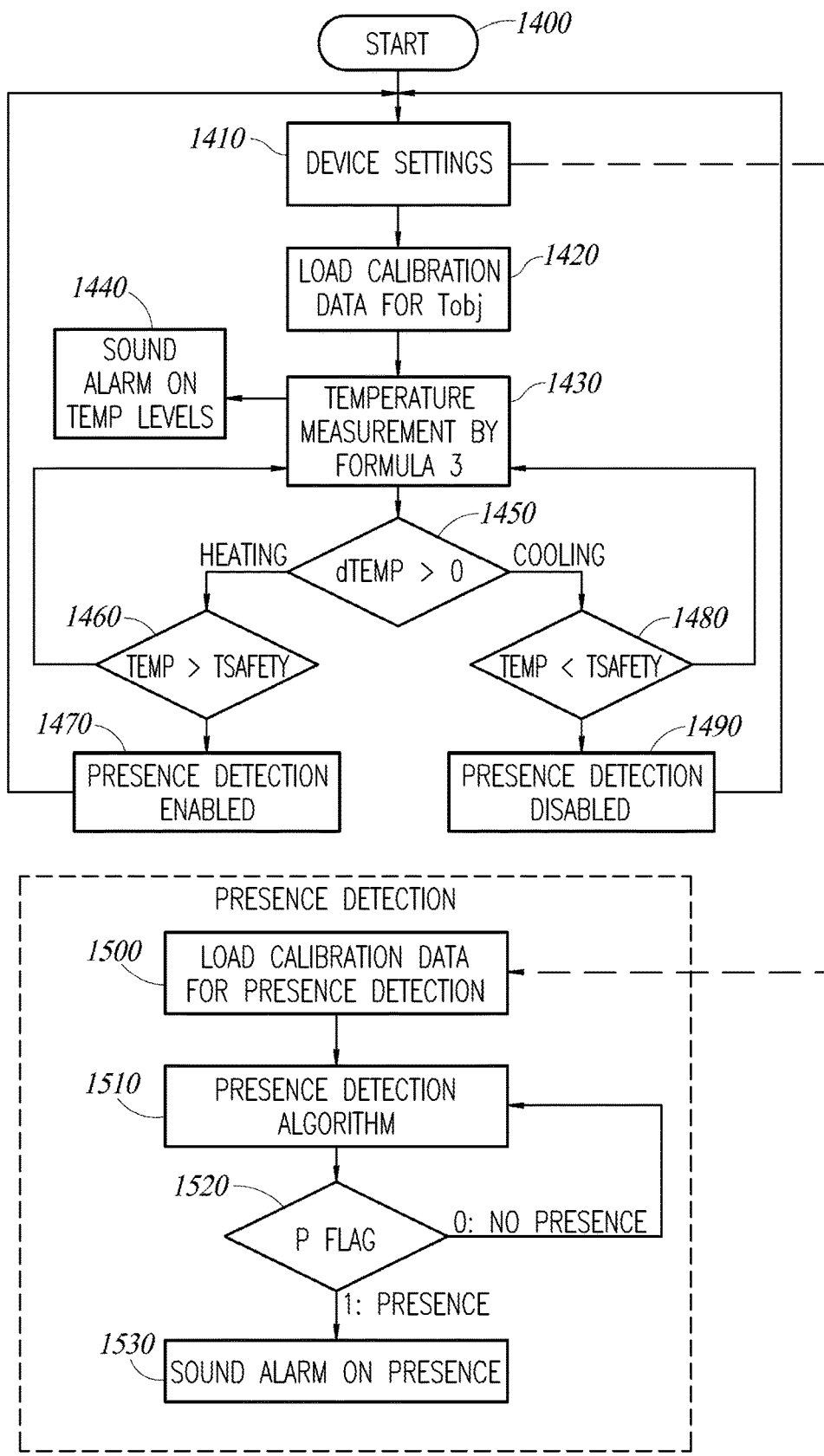
FIG. 14 illustrates a sample flow of the process of a device performing both temperature measurement and presence detection according to some embodiments of the present disclosure.

FIG. 14 illustrates a sample flow of the process of a device performing both temperature measurement and presence detection according to some embodiments of the present disclosure.

The process is initiated at 1400. At 1410, the settings of a device 100 or specifically the settings of a device 130 is set. For example, the ODR may be set to 8 Hz and the gain may be set to 16. However, as mentioned previously, this is merely an example and various different settings may be used. As will be discussed below, the same raw infrared data (e.g., calibration data) is used for determining temperature as well as presence.

At 1420, the raw infrared data which is in the form of intensity of infrared wavelengths are collected through a sensor 200. At 1430, the temperature of one or more objects are obtained based on Formula 3 which takes into account both the rise of temperature in the processor (e.g., ASIC) as well as the emissivity of surrounding materials within the field of view.

At 1440, an alarm may be set to go off based on one or more temperature levels. The alert device 280 may be set accordingly to sound the alarm at one or more temperature levels programmed.

At 1450, delta value of a temperature (e.g., difference between a current temperature measurement and a previous temperature measurement of an object) dTemp is calculated by the processor 210 to determine whether the object is heating or cooling. When dTemp is greater than 0, this is indicative of the fact that the temperature is rising (e.g. heating). On the other hand, when dTemp is smaller than 0, this is indicative of the fact that the temperature is dropping (e.g., cooling).

At 1460, when the measured temperature is above a safety temperature threshold $T_{safety}$, a presence detection mechanism is enabled at 1470. However, in some applications, the presence detection mechanism may be enabled by the user regardless of comparing the currently measured temperature with the safety temperature threshold $T_{safety}$. The safety temperature threshold T safety is indicative a temperature threshold as set by a user. For example, a mother cooking dinner may set 60 degrees as a safety temperature threshold $T_{safety}$ while she is away so that her child is alerted using presence detection when the child tries to approach the heated cooker and the other heated objects on and adjacent to the cooker.

At 1480, when the temperature is cooling down, and when the measured temperature is below a safety temperature threshold $T_{safety}$, a presence detection mechanism is disabled at 1490. For example, if the current temperature is below the safety temperature threshold $T_{safety}$ of 60 degrees, the presence detection mechanism is disabled as there is no threat or danger associated with heated objects on and adjacent to the cooker.

In some embodiments, the activation of the presence detection algorithm can be set regardless of comparing the safety threshold temperature by the user, as described above.

After the settings of the device is completed at 1410, the raw infrared data which is in the form of intensity of infrared signals are collected through the sensor 200 at 1500. The infrared data collected at 1420 and the infrared data collected at 1500 is identical and collected through an identical process. That is, while the flow shown in FIG. 14 has used separate blocks for 1420 and 1500, these steps are identical and can be consolidated together. That is, the calibration data for $T_{obj}$ in 1420 and calibration data for presence detection at 1500 are the same. Merely, different processes or algorithms are applied to analyze the raw data. For the former data collected at 1420, temperature determination process using Formula 3 is applied, and for the latter data collected at 1500, presence determination process using presence algorithm described in FIGS. 10-13 is applied (see 1510).

At 1520, a presence flag PF or P Flag is set up and the presence signals are compared with the presence filter PM (see FIG. 11). If the P Flag output is logic value 0 which is indicative of no presence, the step returns to 1500 and continues to 1510 to further analyze based on updated infrared data (or load new calibration data). At 1530, if the P Flag output is logic value 1 which is indicative of presence, an alarm may sound from the alert device 280.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
   an infrared sensor having a field of view;
   a processor coupled to the infrared sensor, the processor including:
   a temperature determination circuit configured to determine a temperature of one or more objects on or adjacent to a heat generating structure within the field of view of the infrared sensor;
   a presence determination circuit configured to detect presence within the field of view of the infrared sensor;

a compensation circuit configured to compensate the temperature based on a temperature of the processor and characteristics of the one or more objects on or adjacent to the heat generating structure in the field of view of the infrared sensor, wherein the characteristics of the one or more objects include a type of a material and emissivity of the material, and wherein the presence determination circuit is disabled in response to determining that the temperature compensated by the compensation circuit is below a safety temperature threshold.

2. The device according to claim 1, wherein the sensor includes a CMOS-SOI transistor.

3. The device according to claim 1, wherein compensating the temperature by the compensation circuit includes adjusting the temperature of the one or more objects based on an increased temperature of the processor caused by a heat flow from the one or more objects on and adjacent to the heat generating structure.

4. The device according to claim 1, wherein the presence determination circuit is enabled in response to determining that the temperature compensated by the compensation circuit is above the safety temperature threshold.

5. The device according to claim 1, wherein the sensor includes a first surface that is facing the heat generating structure, further comprising a lens on the first surface of the sensor to be arranged between the sensor and the heat generating structure, wherein the lens coupled to the sensor adjusts the field of view of the sensor.

6. The device according to claim 5, wherein the lens includes a semi-spherical lens.

7. A system, comprising, a heat generating source;

a support structure above and aligned with the heat generating source, the support structure having a first surface facing the heat generating source;

a device on the first surface of the support structure, the device including:

a sensor having a field of view, the sensor configured to collect infrared data of one or more objects within the field of view, the sensor facing the heat generating source, the infrared data indicative of an intensity of infrared light;

a temperature determination circuit coupled to the sensor, the temperature determination circuit configured to determine temperature of the one or more objects within the field of view;

a compensation circuit configured to compensate temperature based on a temperature of a processor and emissivity of the one or more objects within the field of view; and a presence determination circuit configured to detect presence within the field of view of the sensor, wherein the presence determination circuit is disabled in response to determining that the temperature compensated by the compensation circuit is below a safety temperature threshold.

8. The system according to claim 7, wherein the compensation circuit compensates a temperature of an object within the field of view of the sensor based on the following formula:

$$Tobj(°\text{C.})_i = \sqrt[4]{\frac{Tobj_{raw} - (M * T_{asic} + c)}{(\varepsilon * K_{corr} * k) * (1 + Ga * (Tobj(°\text{C.})_{i-1} - 25) + Fb * (T_{asic} - 25))} + (T_{asic} + 273.15)^4} - 273.15 - \text{Offset}$$

wherein a temperature of an object is $T_{obj}$, a collected infrared data from the object is $Tobj_{raw}$, $\varepsilon$ is emissivity of the object, Offset is an amount of offset which is a constant, a temperature of device is $T_{asic}$, m, c, k, Ga, Fb are known coefficients, $k_{corr}$ is a correlation coefficient, and if i==0 then $Tobj(°\text{C.})_{i-1}=25$ (° C.).

9. The system according to claim 8, wherein the compensation circuit compensates temperature based on the correlation coefficient $k_{corr}$ by additionally adjusting the correlation coefficient $k_{corr}$ to the emissivity of the object.

10. The system according to claim 7, wherein the presence determination circuit is enabled in response to determining that the temperature compensated by the compensation circuit is above the safety temperature threshold.

11. The system according to claim 7, wherein a central point of an active area of the sensor is aligned with a central point of the heating generating source.

12. The system according to claim 11, wherein the sensor includes a first surface that is facing the heat generating source, further comprising a lens on the first surface of the sensor to be arranged between the sensor and the heat generating source, wherein the lens coupled to the sensor narrows the field of view of the sensor.

13. A method comprising:

receiving first infrared data from one or more objects within a field of view of a sensor;

determining a first temperature of the one or more objects using the first infrared data;

compensating the first temperature of the one or more objects based on a first temperature of a processor and characteristics of the one or more objects within the field of view of the sensor;

in response to determining that the first temperature of the one or more objects compensated based on the first temperature of the processor and the characteristics of the one or more objects within the field of view of the sensor is below a safety temperature threshold, disabling a presence determination circuit;

receiving second infrared data from the one or more objects within the field of view of the sensor;

determining a second temperature of the one or more objects using the second infrared data;

compensating the second temperature of the one or more objects based on a second temperature of the processor and the characteristics of the one or more objects within the field of view of the sensor;

in response to determining that the second temperature of the one or more objects compensated based on the second temperature of the processor and the characteristics of the one or more objects within the field of view of the sensor is above the safety temperature threshold: enabling the presence determination circuit;

applying, by the presence determination circuit, a first low pass filter to the second infrared data and applying a second low pass filter to the second infrared data, the second low pass filter being different from the first low pass filter;

determining, by the presence determination circuit, presence signals based on a difference between an outcome of applying the first low pass filter to the second infrared data and an outcome of applying the second low pass filter to the second infrared data;

comparing, by the presence determination circuit, the presence signals with a difference of a presence threshold and a hysteresis threshold; and determining, by the presence determination circuit, a presence of a subject within the field of view based on the comparing the presence signals with the difference of the presence threshold and the hysteresis threshold.

14. The method of claim 13, determining that the subject is present when the presence signals are greater than the difference of the presence threshold and the hysteresis threshold.

15. The method of claim 13, determining that the subject is absent when the presence signals are smaller than the difference of the presence threshold and the hysteresis threshold.

16. The method of claim 14, further comprising:

transmitting a notification signal in response to the presence signals being greater than the difference of the presence threshold and the hysteresis threshold.

* * * * *